(12) United States Patent
King

(10) Patent No.: US 8,987,935 B2
(45) Date of Patent: Mar. 24, 2015

(54) UNINTERRUPTIBLE BATTERY POWER FOR ELECTRIC MOTOR VEHICLE

(76) Inventor: Allen King, San Jose, CA (US)

( * ) Notice: Subject to any disclaimer, the term of this patent is extended or adjusted under 35 U.S.C. 154(b) by 637 days.

(21) Appl. No.: 13/341,275

(22) Filed: Dec. 30, 2011

(65) Prior Publication Data

US 2013/0169038 A1    Jul. 4, 2013

(51) Int. Cl.
*H02J 7/00* (2006.01)
*B60L 3/00* (2006.01)
*B60L 11/18* (2006.01)

(52) U.S. Cl.
CPC .............. *H02J 7/0031* (2013.01); *B60L 3/0046* (2013.01); *B60L 11/1853* (2013.01); *Y02T 10/7005* (2013.01); *Y02T 10/705* (2013.01)
USPC ....................................................... 307/10.1

(58) Field of Classification Search
USPC ........................................................ 307/10.1
See application file for complete search history.

(56) References Cited

U.S. PATENT DOCUMENTS

| | | | |
|---|---|---|---|
| 3,456,122 A | 7/1969 | Hurd | |
| 4,277,737 A | 7/1981 | Muller-Werth | |
| 4,962,462 A | 10/1990 | Fekete | |
| 5,534,364 A | 7/1996 | Watanabe et al. | |
| 5,571,999 A | 11/1996 | Harris | |
| 5,619,417 A | 4/1997 | Kendall | |
| 5,656,915 A | 8/1997 | Eaves | |
| 5,703,464 A | 12/1997 | Karunasiri et al. | |
| 5,931,245 A | 8/1999 | Uetake et al. | |
| 6,459,236 B2 * | 10/2002 | Kawashima | 320/118 |
| 7,705,491 B2 * | 4/2010 | King et al. | 307/80 |

* cited by examiner

*Primary Examiner* — Rexford Barnie
*Assistant Examiner* — Daniel Kessie
(74) *Attorney, Agent, or Firm* — Kunzler Law Group

(57) ABSTRACT

An apparatus, system, and method are disclosed for assuring uninterruptible battery power for a typical electric motor vehicle powered by an array of series-connected member batteries. Such assurance results from a provision of an electrically-operated bypass switch configured to form a closed electrical bypass circuit path across a faulty first member battery upon activation, thus keeping the vehicle powered up. In one embodiment, the bypass switch is a double-pole multi-contact selector switch connected to each member battery and complimented by a pole-connect switch. For an atypical electric motor vehicle, such as with a multiple battery array parallel configuration, a backup battery may be provided and connected with the faulty battery array in series to displace the bypassed member battery, thus maintaining equal voltage outputs from the battery arrays.

19 Claims, 12 Drawing Sheets

UNINTERRUPTIBLE BATTERY POWER FOR ELECTRIC MOTOR VEHICLE

BACKGROUND

1. Field

The subject matter disclosed herein relates to multiple-battery electric systems, and more particularly relates to electric motor vehicles powered by arrays of batteries.

2. Description of the Related Art

Electric motor vehicles such as hybrid electric vehicles ("HEVs") and all-electric vehicles ("EVs") often use electric energy stored in rechargeable batteries. Cells and modules of the battery pack are subject to failure.

BRIEF SUMMARY

The apparatus to assure uninterruptible battery power for an electric motor vehicle is provided with a logic unit containing a plurality of modules configured to functionally execute the necessary steps of such assurance. These modules in the disclosed embodiments include an electrically-operated bypass switch and a switch activator module. The bypass switch is configured to form a closed electrical bypass circuit path across a first member battery that is a part of an array of a plurality of series-connected member batteries if activated. The switch activator module is configured to activate the bypass switch in response to detection of a failure in the first member battery.

In another aspect of the present invention, a system is presented to assure uninterruptible battery power for an electric motor vehicle. In particular, the system, in the disclosed embodiments, includes a vehicle operating unit, a vehicle operation controller coupled to the vehicle operating unit, and the battery enclosure coupled to the vehicle operation controller.

The battery enclosure with appropriate cooling means includes a battery array, an uninterruptible power adapter ("UPA"), and a central battery controller. The battery array includes a plurality of series-connected member batteries configured to power the electric motor vehicle. The UPA includes an electrically-operated bypass switch and a switch activator module and electric conductors, or referred to simply as conductors, configured with means to interconnect said components. The bypass switch is configured to form a closed electrical bypass circuit path across a first member battery of the battery array if activated. The switch activator module is configured to activate the bypass switch in response to detection of a failure in the first member battery. The central battery controller, interfacing with said member batteries and the UPA, is configured to provide battery operation and charge control and communication.

A method of the present invention is also presented for assuring uninterruptible battery power for an electric motor vehicle. The method in the disclosed embodiments substantially includes the steps necessary to carry out the functions presented above with respect to the operation of the described apparatus and system. The method includes providing an electrically-operated bypass switch that is configured to form a closed electrical bypass circuit path across a first member battery of an array of a plurality of series-connected member batteries powering the electric motor vehicle if activated, connecting the bypass switch to each member battery electrically, powering the electrical motor vehicle for operation, maintaining communication between member batteries and a central battery controller of the electric motor vehicle, and activating the bypass switch in response to detection of a failure in the first member battery.

For an electric motor vehicle powered by an array of a plurality of series-connected member batteries, the present invention employs an electrically-operated bypass switch activatable to form a closed electrical bypass circuit path across a first member battery found faulty and therefore permanently shut down, thereby keeping the electric motor vehicle powered up and continuously running. The first member battery may be any one of the member batteries in the battery array.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only typical embodiments and are not therefore to be considered to be limiting of scope, the embodiments will be described and explained with additional specificity and detail through the use of the accompanying drawings, in which:

FIG. 1b is a schematic block diagram illustrating one embodiment of module management electronic circuitry inside a representative member battery as shown in FIG. 1a;

DETAILED DESCRIPTION

Figure 1A:
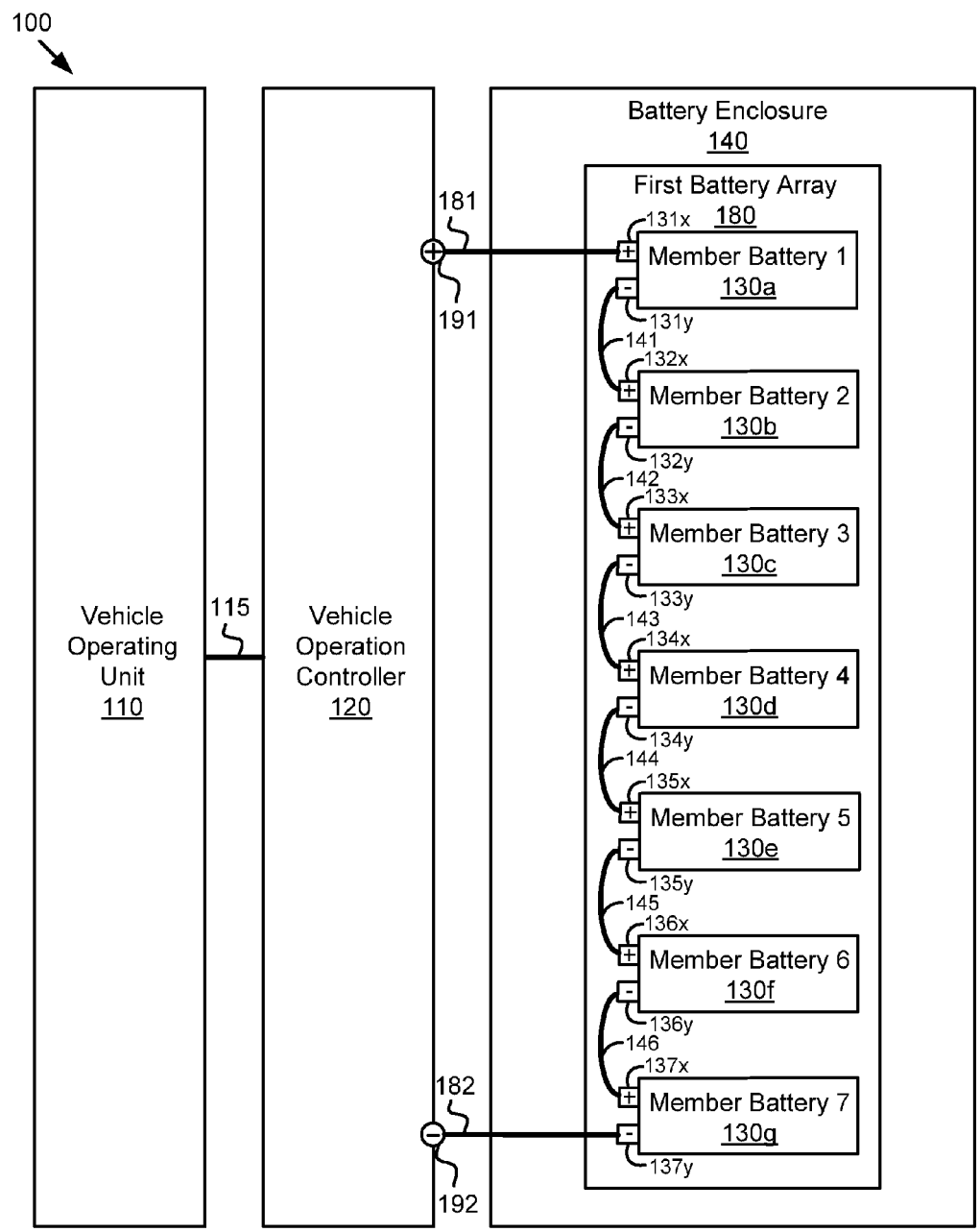
FIG. 1a is a schematic block diagram illustrating one embodiment of a typical conventional system for interconnecting an array of member batteries for supplying power to an electric motor vehicle.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

Many of the functional units described in this specification have been labeled as modules, in order to more particularly emphasize their implementation independence. For example, a module may be implemented as a hardware circuit comprising custom very large scale integration circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments can be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, and systems according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic block diagrams and/or schematic flowchart diagrams in the Figures ("FIGs") below illustrate the architecture, functionality, and operation of possible implementations of apparatuses, systems, and methods according to various embodiments of the present invention. In this regard, each block in the schematic block diagrams and/or schematic flowchart diagrams may represent a module, segment, or portion of code, which comprises one or more executable instructions of the program code for implementing the specified logical function(s).

It should also be noted that, in some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated FIGs.

Although various arrow types and line types may be employed in the block and/or flowchart diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1a is a schematic block diagram illustrating one embodiment of a typical conventional system 100 for interconnecting an array of member batteries for supplying power to an electric motor vehicle. The system 100 includes a vehicle operating unit 110, a vehicle operation controller 120, an interface 115 coupling the vehicle operation controller 120 to the vehicle operating unit 110, and a battery enclosure 140 comprising a first battery array 180 of seven series-connected member batteries numbered consecutively from 1 to 7 130a-g and a plurality of electric conductors, or simply connectors, 141 through 146, 181 and 182, plus cooling means and a central battery controller (both not shown). Although seven member batteries (each being a battery module) are shown, any number greater than one may be employed. For example, for an EV voltage requirement of about 300V, 20 lithium ion ("Li-ion") battery modules each having four 3.7V cells may be used. Although one array of member batteries is shown, as usually the case for a typical electric motor vehicle such as electric car, in an atypical case, a multiple battery array parallel configuration (not shown) to attain higher capacity for increased current handling may be available, wherein two or more battery arrays having equal voltage outputs are connected in parallel, such as used in certain electric truck and electric bus.

In one embodiment, the electric motor vehicle referred to in the system 100 is an EV. As such, the components (not shown) in a typical vehicle operating unit 110 include an electric motor, traction wheels, and other parts of a drive system that may also be used in an internal combustion vehicle. The vehicle operation controller 120 supplies electric power to the electric motor from the first battery array 180 through its positive terminal 191 and negative terminal 192 with conductors 181 and 182, respectively. When the EV driver presses the accelerator pedal, a signal is sent to the vehicle operation controller 120, which in turn supplies an appropriate amount of current and voltage from the first battery array 180 to the electric motor based on the position of said pedal. The electric motor in turn applies torque to the EV wheels for turning, causing the EV to move.

The vehicle operation controller 120 operates between member batteries 130 and the electric motor to control speed and acceleration in the EV. The vehicle operation controller 120 either transforms the member batteries' 130 DC current into alternating current for an AC motor or simply regulates current flow for a DC motor. In certain EV/HEV embodiments, the vehicle operation controller 120 can also be used to reverse the field coils of the motor, so that when in a braking mode, the motor becomes a generator, and some energy is put back into member batteries 130, thus increasing the range of the car. This energy recovery mechanism is known as regenerative braking.

As shown, the first battery array 180 of a plurality of battery modules includes member batteries 1 through 7 130a-g (collectively or individually referred to as 130), with positive terminal 131x, 132x, ... 137x and negative terminal 131y, 132y, ... 137y, respectively. In general, batteries are said to be in series when the negative terminal (131y, for example) of one member battery (130a) is connected to the positive terminal (132x) of the adjacent member battery (130b) with a conductor (141), and this arrangement may be continued for any desired number of member batteries 130 to be connected in series, as usually practiced in the industry. The voltages of member batteries connected in series are additive. The two end terminals, one positive terminal 191 and one negative terminal 192, of the first battery array 180, which includes series-connected member batteries 130, are connected to the vehicle operation controller 120 to provide a combined total voltage across them.

Each member battery 130 may include module management electronic circuitry and circuitry for interfacing a central battery controller (not shown). The member batteries 130 may be swappable for servicing or upgrade and rechargeable while the using vehicle is not in operation. As can be demonstrated, an occurrence of a failure in any member battery 130, however rare it may be, can break the series "chain", resulting in an open-circuit condition across the battery array's 180 terminals 191 and 192. Upon detection of the failure, the central battery controller usually causes the battery power to be removed from the electric motor. The conventional system 100 for interconnecting member batteries 130 in series in the first battery array 180 for supplying power to an electric motor vehicle is subject to battery failures, resulting in an unexpected sudden stop of the vehicle, possibly in the middle of nowhere.

Figure 1B:
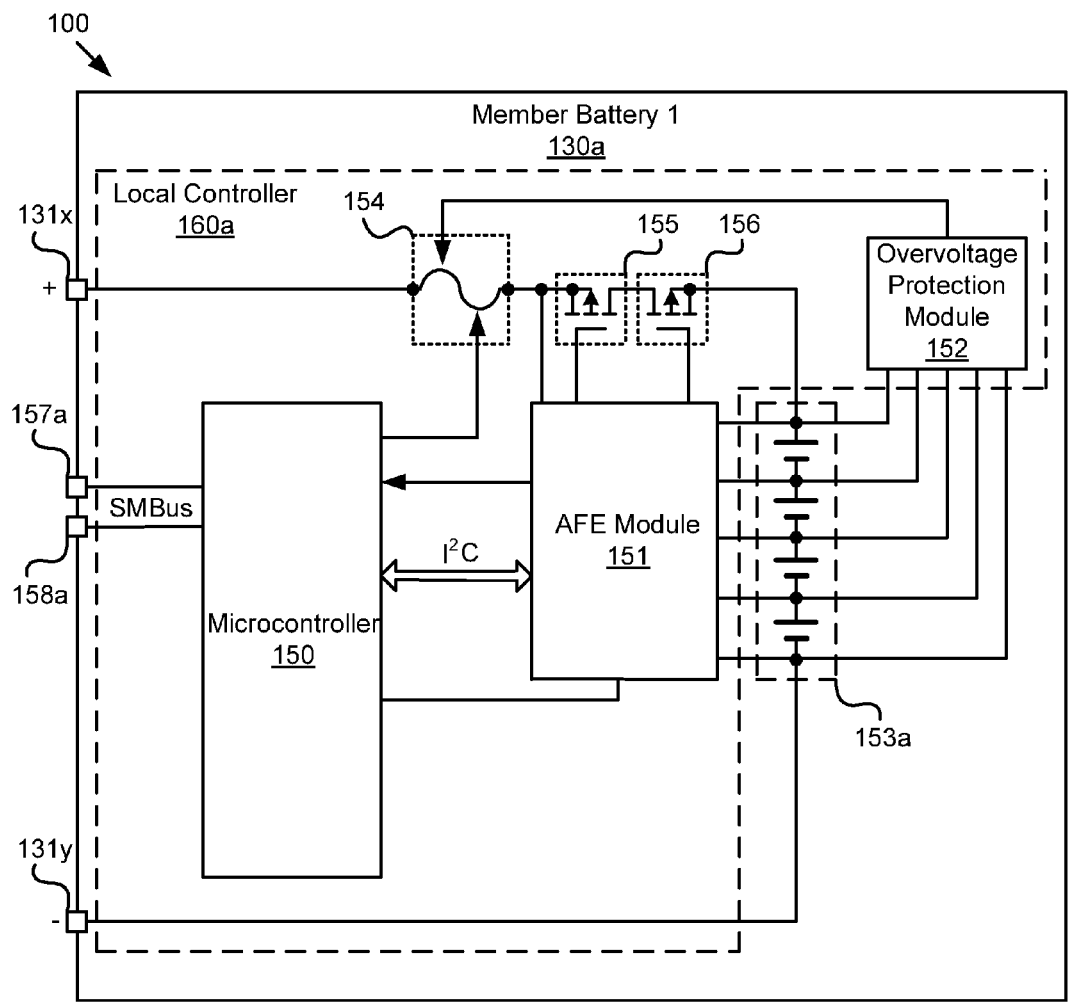

FIG. 1b is a schematic block diagram illustrating one embodiment of module management electronic circuitry inside a representative member battery as shown in FIG. 1a. The description of FIG. 1b refers to elements of FIG. 1a, like numbers referring to like elements. As depicted, member battery 1 130a is chosen for the description. Member battery 1 130a includes a local controller 160a and a string of four series-connected cells 153a of the battery type such as Li-ion or Li-polymer battery. The local controller 160a includes battery module management electronic circuitry. Although a string of four series cells are shown, there may be cells connected in parallel in the string and other string sizes such as 8-12 cells, which are commercially available. As well known in the art, each module of the battery system should not cause catastrophic failures due to such fault conditions as overvoltage, overcurrent, short circuit, overtemperature and external discrete component failures. Therefore, each local controller 160(a-g) provides redundant protection, such as having at least two independent protection circuits or mechanisms in the module.

Bearing similarity in the design of a personal computer battery pack, the local controller 160a of the battery module in the depicted embodiment includes a microcontroller 150, an analog front-end ("AFE") module 151, an interface therebetween ($I^2C$ bus), an overvoltage protection module 152, a discharge metal-oxide-semiconductor field-effect transistor ("MOSFET") 155, a charge MOSFET 156, a non-resettable chemical fuse 154, and a Smart Battery-based System Management Bus ("SMBus") interface with two signal pins: System Management Data ("SMD") 157a and System Management Clock ("SMC") 158a. The functions of these components are described below.

In addition to charge control and measuring and calculating the available charge in battery cells 153a, the microcontroller 150 equipped with an analog to digital converter ("ADC") supports a wide range of first-level and second-level battery safety features. The first-level safety features include: battery cell- and module-level over/undervoltage protection, charge/discharge overcurrent protection, short circuit protection and overtemperature protection. The second-level safety features are used to indicate more serious faults and can cause an in-line fuse (154, for example) to be blown to permanently disable the battery module. The second-level safety features include protection against: safety overvoltage, battery cell imbalance, safety overcurrent, safety overtemperature, open thermister (not shown), charge and discharge MOSFETs 156 and 155 faults, fuse blow failure detection, AFE module 151 communication error, and internal flash data error. A unique algorithm used by the microcontroller 150 allows for real-time tracking of battery capacity change, battery impedance, voltage, current, temperature and other critical operating parameters of the member battery 1 130a. The microcontroller 150 may be used to produce certain control signals to initiate appropriate safety precautions for the cells 153a.

In the shown embodiment, the microcontroller 150 uses the Smart Battery SMBus protocols to communicate with external devices. SMBus consists of data line SMD 157a and clock line SMC 158a, via which the central battery controller, local controllers 160a-g, and a battery charger (not shown) communicate with each other. All these controllers working together form what is known as battery management system ("BMS"). The central battery controller may initiate communication with the microcontroller 150 through the SMBus and also allows the battery system to efficiently monitor the performance of the cells 153a. The central battery controller may also provide a real-time load power limit feedback signal to vehicle operation controller 120. When a battery module needs a service action, the central battery controller may also notify the vehicle operator through a communication bus common to other systems in the vehicle, such as Control Area Network ("CAN"), which is widely used in the automotive industry. In some instances, a special version of CAN bus may be used as an alternative to the SMBus for internal communication.

The main task of the AFE module 151 is overcurrent and short circuit detection and protection of the discharge MOSFET 155, charge MOSFET 156, and other inline components from excessive current conditions. The overcurrent detection is used to detect excessive over current in the battery charge direction while the short circuit detection is used to detect excessive current in either the charge or discharge direction. The AFE module's 151 threshold and delay time of overcurrent and short circuit may be programmed through the microcontroller 150. When an overcurrent or short circuit is detected and a programmed delay time has expired, both discharge and charge MOSFETs 155 and 156 are turned off autonomously, and the details of the condition are reported in the status register of AFE module 151, so that the microcontroller 150 can read and investigate causes of the failure.

The AFE module 151 provides all the high voltage interface needs and hardware current protection features. It offers Inter-IC ("$I^2C$") bus compatible interface, of which SMbus is a specific implementation, to allow the microcontroller 150 to have access to the AFE module 151 registers and to configure the AFE module's 151 protection features. The AFE module 151 also provides cell balancing control. While the microcontroller 150 has two tiers of charge/discharge overcurrent protection settings, the AFE module 151 provides a third level of discharge overcurrent protection. In case of short circuit conditions when the MOSFETs 155 and 156 and the battery cells 153a can be damaged within seconds, the microcontroller 150 depends on the AFE module 151 to autonomously shut off the MOSFETs 155 and 156, preventing current from flowing through the module terminals 131x and 131y, before such damage occurs.

As known in the art, Li-ion and Li-polymer battery chemistries cannot be overcharged without damaging active materials. The electrolyte breakdown voltage is precariously close to the fully charged terminal voltage, typically in the range between 4.1 and 4.3 V/cell. The voltage of each of series-connected lithium cells in the string must be monitored and controlled, and therefore proper cell balancing is necessary. Overvoltage may occur during charging of batteries from an external charging power source while the EV is not in operation. However, while the EV is in operation, battery charging occurs frequently via regenerative braking mentioned previously. Regenerative braking can cause problems for Li-ion batteries because the instantaneous regenerative braking current inrush can cause battery voltage to increase suddenly, possibly over the electrolyte breakdown threshold voltage. Generally, charging current is interrupted if the voltage across any cell exceeds about 4.3V, internal pressure exceeds a preset threshold, or internal temperature rises to an unsafe level. Li-ion batteries usually are left in an unusable state after any of those conditions occurs.

While the microcontroller 150 and its associated AFE module 151 provide overvoltage protection, the sampled nature of the voltage monitoring limits the response time of the protection system. The overvoltage protection module 152 is a fast-response, real time, independent overvoltage monitoring integrated circuit ("IC") that operates in conjunction with the microcontroller 150 and AFE module 151. The overvoltage protection module 152 monitors individual cell voltages independently of the microcontroller 150 and the AFE module 151, and provides a logic level output which toggles if any of the cells 153a reaches a hard-coded overvoltage limit. The response time of the overvoltage protection is determined by the value of an external delay capacitor (not shown). In a typical application, the output of the overvoltage protection module 152 would trigger a fail-safe protection device such as a non-resettable chemical fuse 154 to permanently disconnect member battery 1 130a from the using system. Usually, when this permanent disconnection occurs, the central battery controller is immediately notified, which reacts to cause the battery power to be removed from the connected EV electric motor through the vehicle operation controller 120 and a notification to the vehicle operator to be sent for servicing of the faulty battery module. The net effect is that the EV operation is abruptly stopped.

In summary, it is critical for the BMS to provide conservative means of shutting down the first battery array 180 under any unrecovered battery fault condition detected by local controllers 160. Permanent failure detection includes safety overcurrent discharge and charge fault, short circuit, safety overtemperature in discharge/charge, safety overvoltage fault, cell imbalance fault, a discharge MOSFET 155 fault and a charge MOSFET 156 fault. Usually, it is the manufacturer's call to enable any combination of said permanent failure detections. When any one of these enabled faults is detected, the chemical fuse 154 will be blown to permanently disable member battery 1 130a. As an extra fail-proof of electronic component failure, the local controller 160a is designed to detect if the MOSFETs 155 and 156 fail. If either one is shorted, then the chemical fuse 154 will also be blown.

Furthermore, the battery may have internal micro-short when the metal micro particles and other impurities from the packaging enclosure sealing process contaminate the interior of cells. The internal micro-short significantly increase the self-discharge rate which results in lower open circuit voltage than that of the normal cells. The microcontroller 150 monitors the open circuit voltage and, therefore, detects cell imbalance when the open circuit voltage difference between cells exceeds a preset threshold. When this type of failure occurs, a permanent failure is signaled and MOSFETs 155 and 156 are opened, and the chemical fuse 154 is configurable to blow as well. This will render the first battery array 180 unusable as a power source, thus preventing the failure from causing hazards. The representative module management electronic circuitry, or local controller 160a, detects and recovers from possible fault conditions of battery cells (and electronic components) included in a member battery 130a while the vehicle is in operation; it permanently shuts down the member battery 130a in the case of any such unrecovered fault, resulting in breaking the series chain of the first battery array 180, causing immediate discontinuance of vehicle operation for safety reasons.

Figure 2:
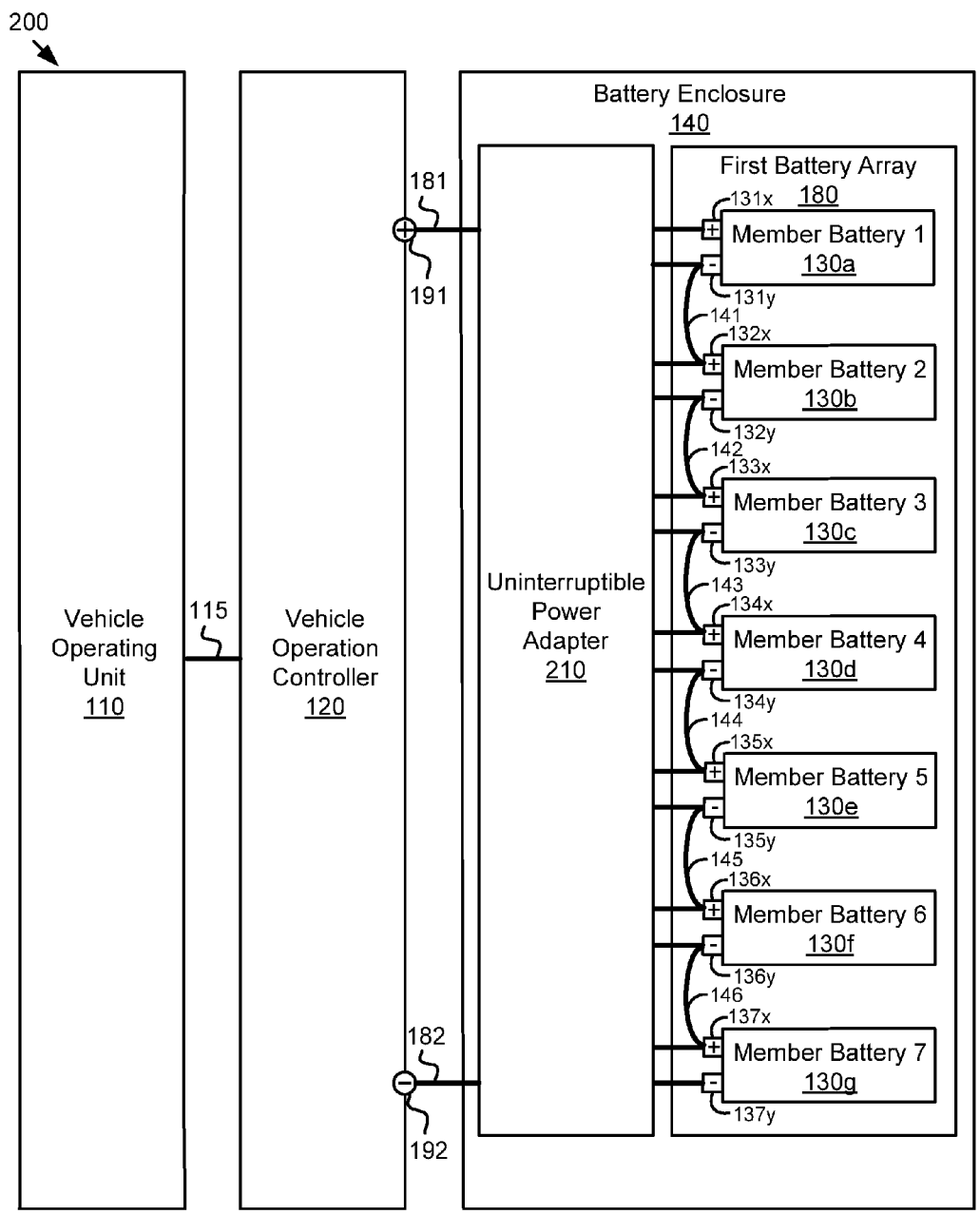
FIG. 2 is a schematic block diagram illustrating one embodiment of a system for assuring uninterruptible battery power in an electric motor vehicle in accordance with the present invention.

FIG. 2 is a schematic block diagram illustrating one embodiment of a system 200 for assuring uninterruptible battery power in an electric motor vehicle in accordance with the present invention. The description of system 200 refers to elements of FIGS. 1a and 1b, like numbers referring to like elements. Like the system 100, the system 200 includes a vehicle operating unit 110, a vehicle operation controller 120, an interface 115 coupling the vehicle operation controller 120 to the vehicle operating unit 110, and a battery enclosure 140. However, in addition to the first battery array 180 of seven series-connected member batteries 130a-g, a central battery controller and appropriate cooling means for battery cooling (both not shown), the battery enclosure 140 here includes an uninterruptible power adapter ("UPA") 210.

It is clear from the description of the internal structure of a battery module such as member battery 1 130a in FIG. 1b that for any unrecovered battery fault, the module local controller 160a will blow the non-resettable chemical fuse 154 in addition to turning off MOSFETs 155 and 156 that are in series with the cells 153a to permanently disable the battery module, and will usually request that the central battery controller remove battery power from the vehicle electric motor, causing the vehicle to stop moving. Unfortunately, this sudden stop of an EV may occur anywhere on the roadway, putting the vehicle driver and passengers therein, if any, in serious danger. Located between the first battery array 180 and the vehicle operation controller 120, the UPA 210 is designed to cause a first member battery 130 found faulty and made physically broken to be bypassed by forming a closed electrical bypass circuit path across its two terminals (133x and 133y of the broken member battery 3 130c, for example), thus maintaining the series-connection continuity of the first battery array 180, avoiding a battery power interruption. Thus, the vehicle driver can keep driving the vehicle and later arrive at a safe place for battery servicing even though there will be a fractional loss of battery power (about 6% in a 16-member battery array, for example).

In preferred embodiments, to trigger this kind of dynamic automatic bypass of a faulty in-use first member battery 130, the central battery controller needs to intercept a signal from its local controller 160 notifying that the faulty first member battery 130 is permanently shutdown, and raise a control signal for activating the UPA 210 along with identification of the faulty first member battery 130, instead of removing the battery power from the electric motor as a usual response. The central battery controller typically interfaces with member batteries 130 and the UPA 210, and provides battery system on/off control, controls battery charging, determines battery state of charge (analogous to a fuel gauge), logs and processes battery operational and statistical data, and communicates with other parts of the vehicle system. Needless to say, when a failure in the first member battery 130 occurs, the central battery controller is capable of distinguishing between the vehicle's state of being "not in operation" and the state of being "in operation". In the former case, the central battery controller would most likely call for a service action on the faulty member battery 130, prohibiting a resumed vehicle operation, should a serious problem be detected during battery charging at a charging station, for example. In the latter case, the central battery controller may cause the UPA 210 to be activated to keep the EV safely powered up and the vehicle moving, and concurrently indicate the need for a service action on the faulty first member battery 130, without causing the operating vehicle to abruptly stop. The system 200 assures that battery power in an electric motor vehicle is uninterruptible despite the occurrence of a permanently disabled member battery 130.

Figure 3A:
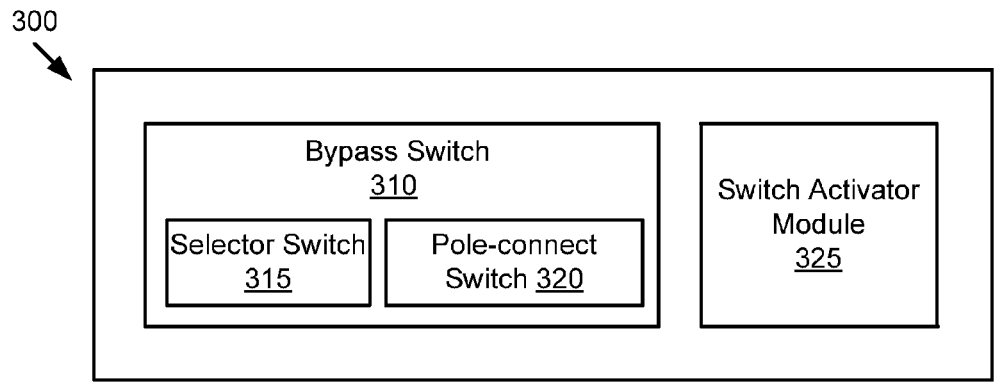
FIG. 3a is a schematic block diagram illustrating one embodiment of an apparatus for assuring uninterruptible battery power in a typical electric motor vehicle in accordance with the present invention.

FIG. 3a is a schematic block diagram illustrating one embodiment of an apparatus 300 for assuring uninterruptible battery power in a typical electric motor vehicle in accordance with the present invention. The description of the uninterruptible battery power assurance apparatus 300 refers to elements of FIGS. 1 and 2, like numbers referring to like elements. Locatable in the UPA 210 of FIG. 2, said apparatus 300 provides main components configured to assure uninterruptible battery power for an electric motor vehicle, such as EV, powered by the first battery array 180 against a first member battery 130 permanently shut down due to a failure while the EV is moving. Said assurance apparatus 300 includes an electrically-operated bypass switch 310 and a switch activator module 325.

In disclosed embodiments, the bypass switch 310 is configured to form a closed electrical bypass circuit path across a first member battery 130 found faulty if activated. Speaking of electrically-operated switches, they are generally available in many forms and may require drive circuits (drivers) for their activation. Relay is one example of those switches. The switch activator module 325 typically containing electronic circuitry activates the bypass switch 310 in response to detection of a failure in the first member battery 130.

In one embodiment, the bypass switch 310 may include a double-pole multi-contact selector switch 315 and a pole-connect switch 320. A pole is the input or common terminal;

it is usually an electrically isolated switching circuit. The two poles of the selector switch 315 are normally unconnected to each other. The selector switch 315 has two separate sets of electrical contacts connectable to the two poles, respectively. One set of contacts are connected to positive terminals of member batteries 130, and the other set of contacts are connected to negatively terminals of member batteries 130. If activated, the selector switch 315 is configured to connect its first pole to the positive terminal of the first member battery 130 found faulty and connect its second pole to the negative terminal of said first member battery 130. Complementing such connections, the pole-connect switch 320 is activated to connect the first pole to the second pole of the selector switch 315, thereby forming a closed electrical bypass circuit path across the first member battery 130 found faulty. Unlike a typical computer system wherein an intelligent multi-position selector switch is used for a host adapter to be selectively connected to one of a number of attached daisy-chained input/output ("I/O") devices each having a pre-set unique ID for responding to a designated selection, the selector switch 315 used here for selectively connecting its two poles to respective terminals of a first member battery 130 found faulty if activated is a non-intelligent passive device.

Figure 4A:
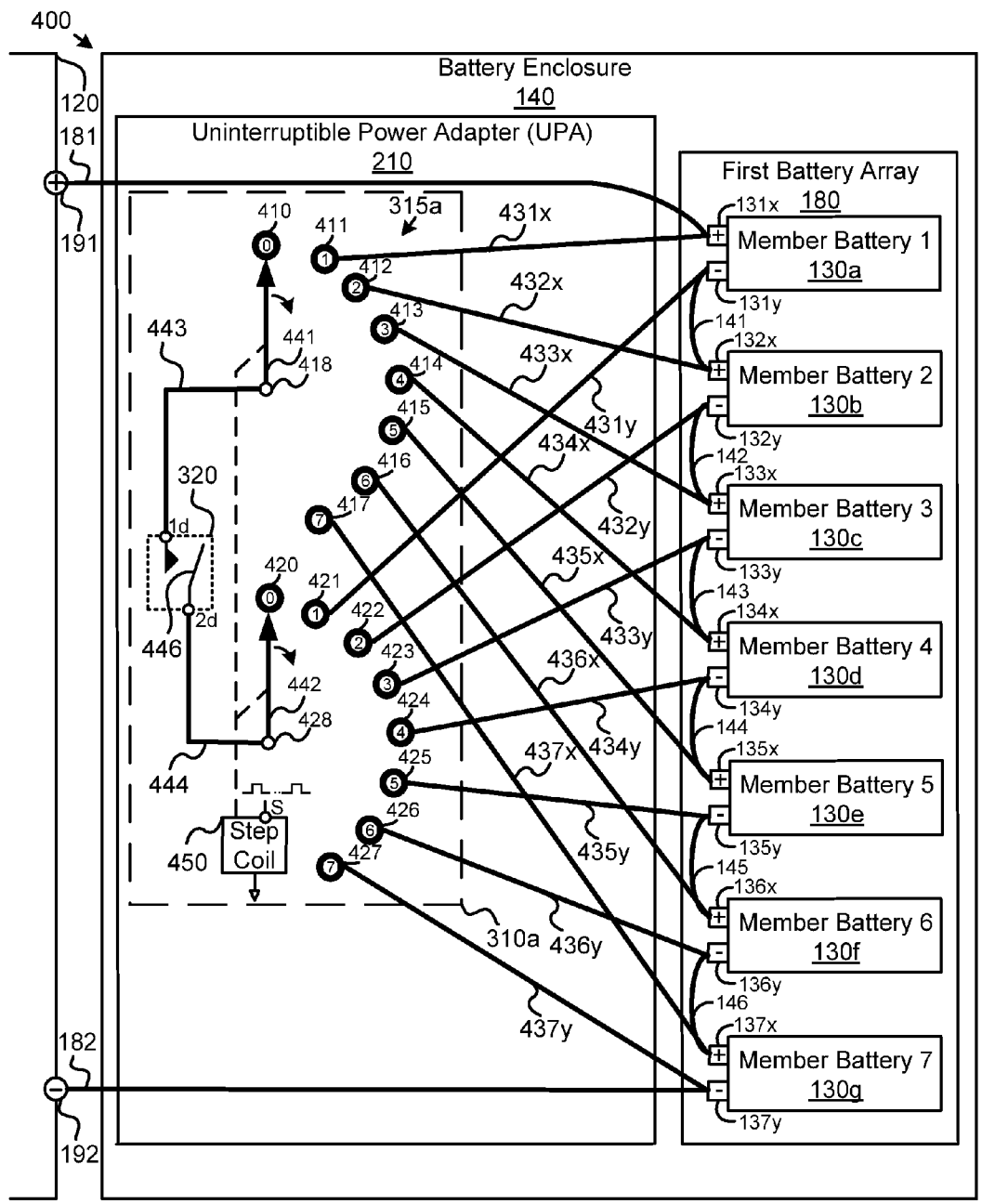
FIG. 4a is a schematic block diagrams illustrating one embodiments of an internal structure of the apparatus of FIG. 3a in connection with a single battery array shown in FIG. 2 in accordance with the present invention.
Figure 4B:
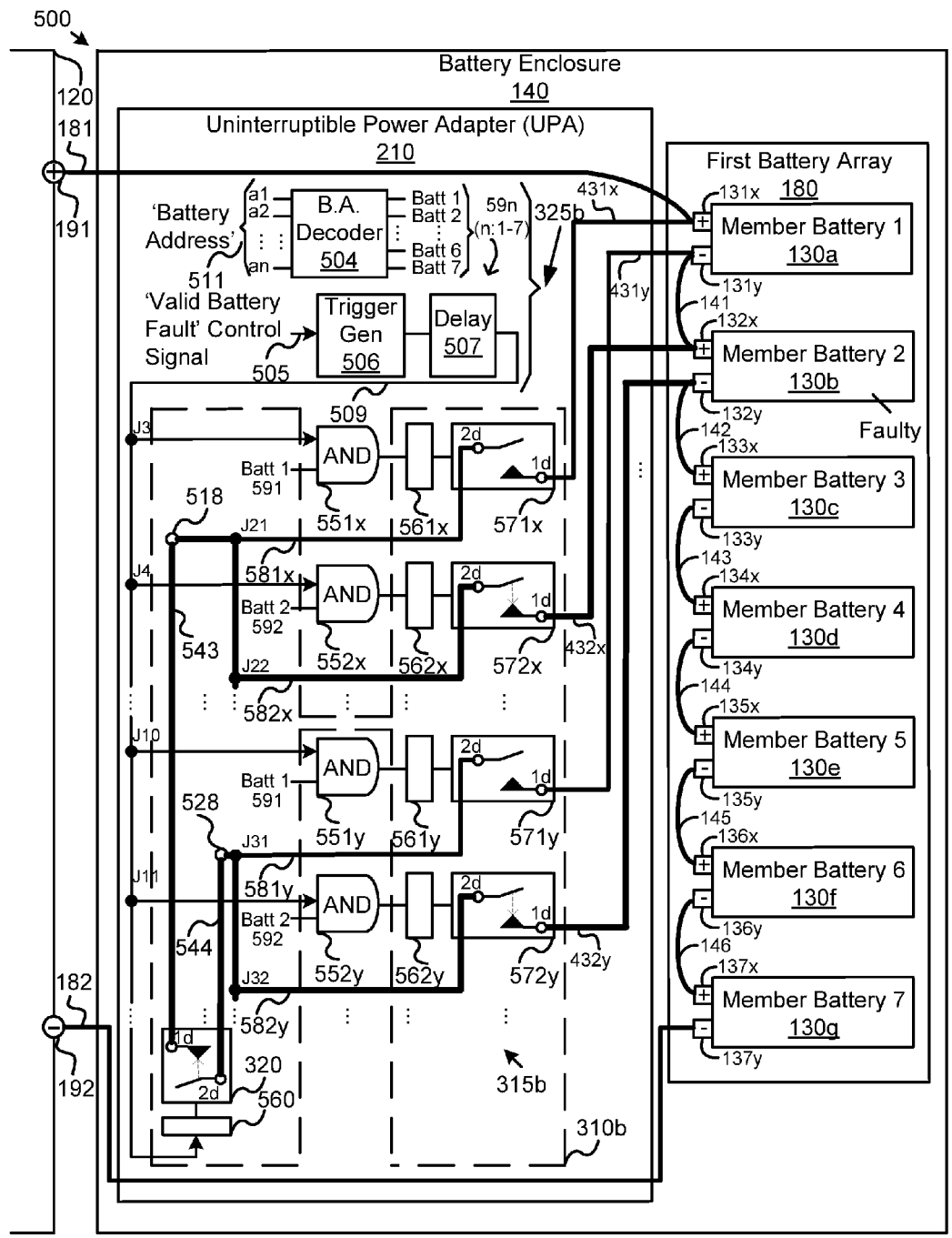
FIG. 4b is a schematic block diagram illustrating one alternative embodiment of the internal structure of the apparatus of FIG. 3a in connection with a single battery array shown in FIG. 2 plus an exemplary battery bypassing in accordance with the present invention.

Hereafter, for the bypass switch 310 used with the first battery array 180, two alternative embodiments of the selector switch 315 are described, wherein the bypass switch 310 will be referred to as bypass switch 310a and bypass switch 310b, as illustrated in FIG. 4a and FIG. 4b, respectively. The bypass switch 310a includes a sequential-access type of selector switch 315a and the pole-connect switch 320 whereas the bypass switch 310b includes a direct-access type of selector switch 315b and the pole-connect switch 320. Accordingly, the switch activator module 325 will be referred to as switch activator module 325a and switch activator module 325b, respectively. In both cases, the same embodiment of the pole-connect switch 320 is employed.

Going back to the occurrence of the permanently disabled faulty first member battery 130, this event typically relates to a physical breaking of the circuit path between the two terminals of the faulty first member battery 130 by its local controller 160 following the discovery of an unrecovered fault condition therein as described previously. In one embodiment, that particular local controller 160 notifies the central battery controller of this event. In response to this notification signal, the central battery controller raises a 'valid battery fault' control signal to the UPA 210 and identifies the faulty first member battery 130 by outputting a digital battery address that can be decoded to obtain the battery number of the faulty first member battery 130. For the illustrated first battery array 180 in FIGS. 1a and 2, the battery numbers are 1, 2 . . . 7 for member batteries 130a-g, respectively.

In an alternative embodiment, the responsible local controller 160 communicates this event to the UPA 210 directly by outputting a 'valid battery fault' control signal to it, in addition to notifying the central battery controller of the occurrence of the associated faulty member battery 130. In this case, the battery number of the faulty first member battery 130 is directly known to the UPA 210 by control signal line association as there are 7 separate control signal lines used for this purpose: one line assigned to each of 7 local controllers 160a-g within 7 member batteries 130a-g connected to the UPA 210. Therefore, a digital battery address is not needed. In either embodiment, the switch activation module 325 is triggered into action by such control signal. At the completion of a bypassing of the faulty first member battery 130, the UPA 210 may return a bypassing confirmation signal to the central battery controller.

Said apparatus 300 may apply to any type of battery besides the lithium type. Furthermore, for those electric motor vehicles employing battery-like energy storage devices ("BESDs") such as fuel cells and ultracapacitors, the latter also known as supercapacitors, and the like, or such combination of BESDs as batteries (or fuel cells) and ultracapacitors, for powering electric motors therein, said apparatus 300 is also applicable. For bypassing a first member BESD found faulty, either embodiment of the bypass battery switch 310 and the switch activator module 325 mentioned previously applies as long as the member BESD has terminals like those of a member battery 130. For a vehicle using a combination of BESDs, a plurality of bypass switches 310 (310a or 310b) may be needed. Said apparatus 300 allows uninterruptible battery power to be supplied by the first battery array 180 to a typical electric motor vehicle by establishing a closed electrical bypass circuit path across the first member battery 130 found faulty, thus enabling the electric motor vehicle to continue to operate.

Figure 3B:
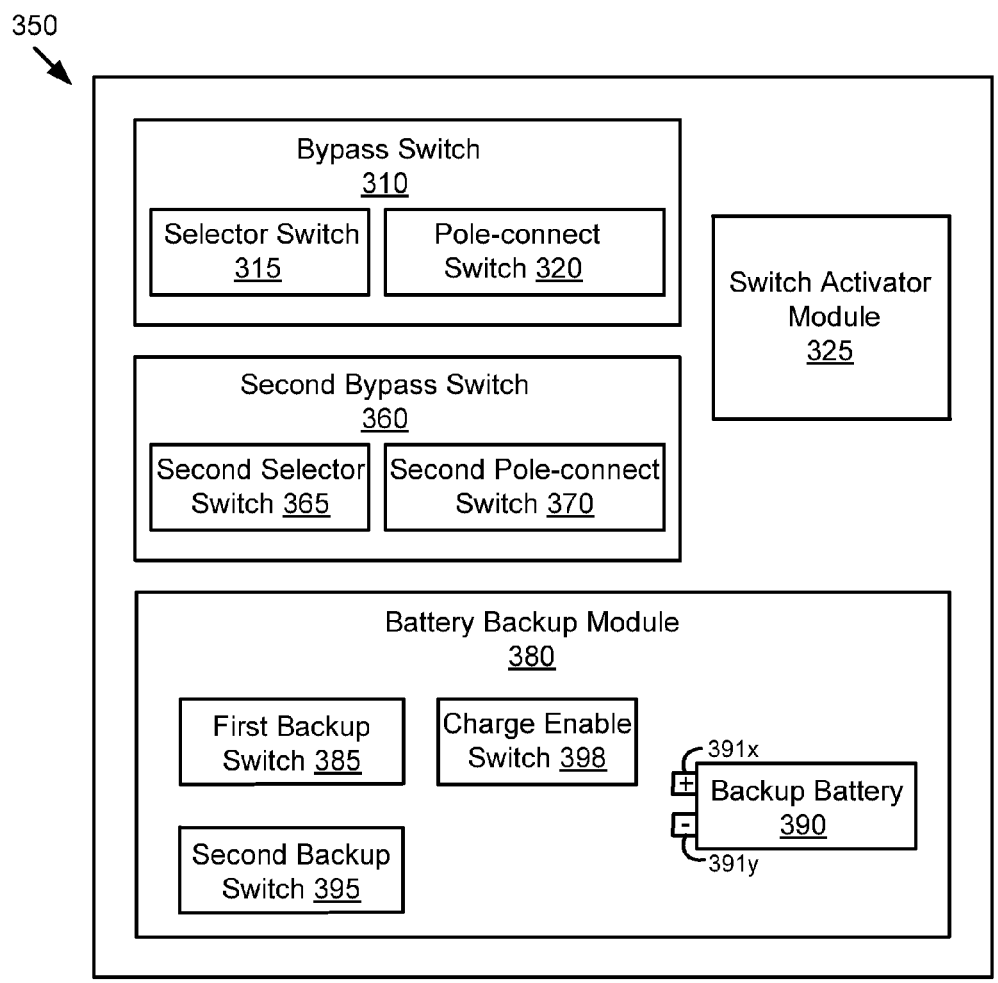
FIG. 3b is a schematic block diagram illustrating one embodiment of an expanded apparatus for assuring uninterruptible battery power in an atypical electric motor vehicle in accordance with the present invention.
Figure 4C:
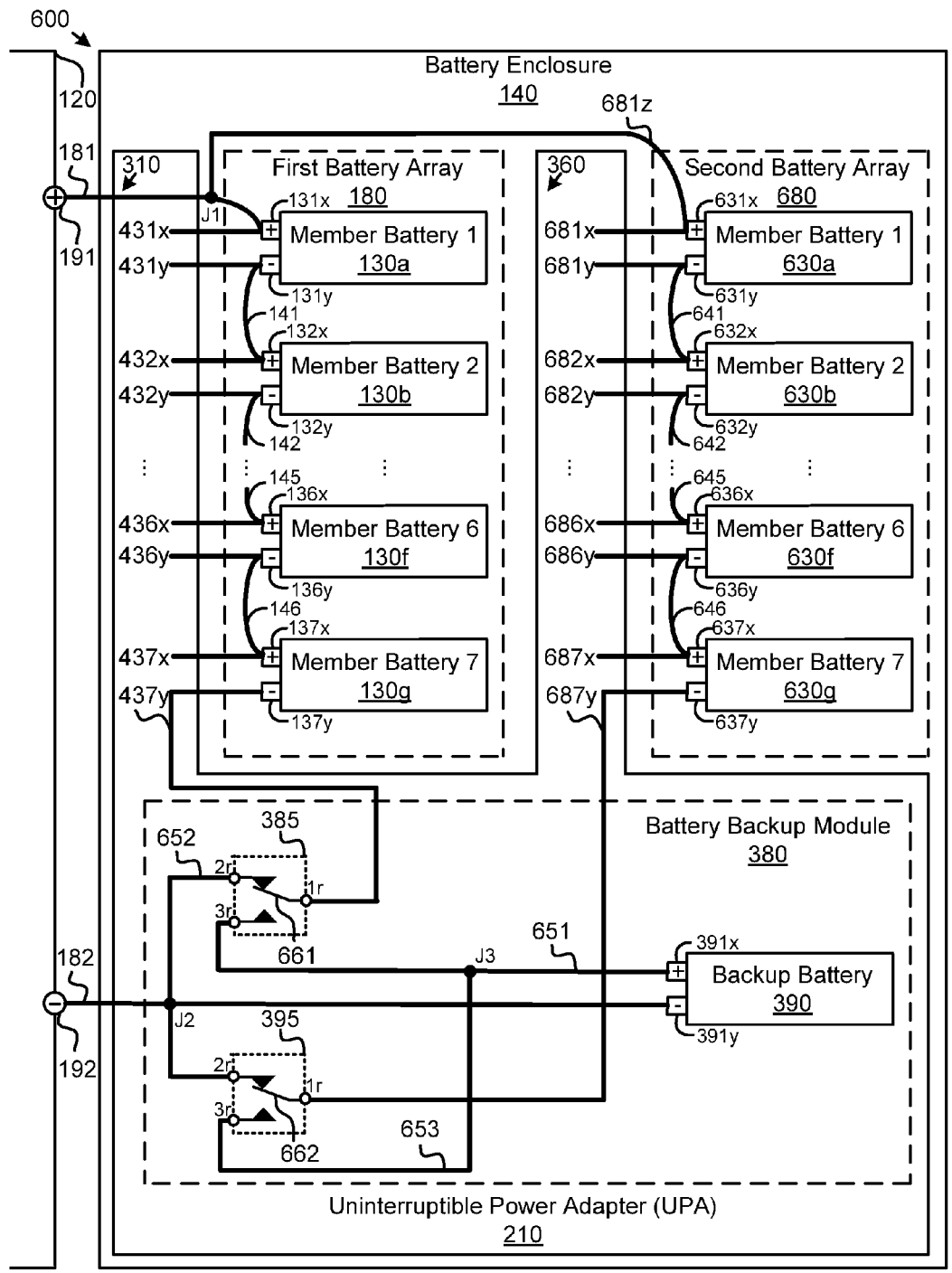
FIG. 4c is a schematic block diagram illustrating one embodiment of an internal structure of the expanded apparatus of FIG. 3b in connection with a dual battery array parallel configuration in accordance with the present invention.

FIG. 3b is a schematic block diagram illustrating one embodiment of an expanded apparatus 350 for assuring uninterruptible battery power in an atypical electric motor vehicle in accordance with the present invention. The description of the expanded uninterruptible battery power assurance apparatus 350 refers to elements of FIGS. 1-2 and 3a, like numbers referring to like elements. Locatable in the UPA 210 of FIG. 2, said expanded assurance apparatus 350 deals with multiple battery arrays connected in parallel to supply extra power to an atypical electric motor vehicle. Based on a battery manufacturers' claim that with the use of advanced battery technology and high production and quality standards, their contemporary batteries rarely ever fail, an assumption is made here that no more than one electric motor vehicle battery may fail at any one point of time during normal operation of the vehicle. For an illustration of said expanded apparatus 350, two like battery arrays 180 and 680 connected in parallel (as shown in FIG. 4c) are chosen as a representative multiple battery array parallel configuration for the atypical vehicle. As shown, additional components are included in said expanded apparatus 350 for the dual arrays, so that if a first member battery in either battery array is found faulty and therefore bypassed, a backup battery included is switched into the faulty battery array in series to displace the bypassed faulty first member battery thereof, thereby maintaining equal voltage outputs from the two battery arrays connected in parallel.

Reasons for having such expanded apparatus 350 are readily understandable. As well known, with the provision of two 16-member battery arrays in parallel, for example, if one member battery in one of the two battery arrays is bypassed because of its failure, then the owning battery array with 15 surviving member batteries can not be connected in parallel with the other battery array having 16 member batteries because of unequal total voltages. Without the use of said expanded apparatus 350, the entire faulty battery array, instead of a single faulty member battery, would have to be shut down to avoid a voltage imbalance of the two battery arrays meant to be connected in parallel, thus resulting in a 50% battery power loss, which may threaten operability of the vehicle and the safety of persons on board.

As depicted, said expanded apparatus 350 includes, in addition to the bypass switch 310 and a switch activator module 325 as shown in FIG. 3a, a second bypass switch 360 and a battery backup module 380. Exactly like the bypass switch 310 in terms of structure and embodiments described previously, the second bypass switch 360 associated with a second battery array 680 includes a second selector switch 365 and a second pole-connect switch 370. As such, if a first member battery 630 in the second battery array 680 is found faulty, the first member battery 630 is bypassed in the same manner as that of the first battery array 180 would be.

The battery backup module 380 includes a single backup battery 390, a first backup switch 385, and a second backup switch 395. The backup battery 390 is pre-charged and configured with electric and electronic characteristics of member batteries, and it is common to, or in other words, shared by, both battery arrays 180 and 680. Having a single backup battery 390 is consistent with the assumption that there may be only one battery failing at any given time, much like one spare tire accommodated by a modern 4-wheel automobile. Furthermore, it is a practical provision because extra space in the battery enclosure 140 may be rather limited. If previously mentioned BESDs are used to power the electric motor vehicle, the backup battery here may be a backup fuel cell or backup ultracapacitor, depending on which devices are actually used in the BESD array.

The first backup switch 385 connects the backup battery 390 in series with the first battery array 180 found faulty if activated by the switch activator module 325. Likewise, the second backup switch 395 connects the backup battery 390 in series with the second battery array 680 found faulty if activated by the switch activator module 325. Note that the switch activator module 325 and the central battery controller are generally assumed to be designed to deal with more than one battery array. In a preferred embodiment, the central battery controller is configured to generate a separate 'valid battery fault' control signal for the second battery array 680 when necessary, and the switch activator module 325 is configured to respond to said control signal accordingly, as they are configured for the first battery array 180.

In a certain embodiment, a charge enable switch 398 of the manually-operated type under remote control is also included in said expanded apparatus 350. The charge enable switch 398 may be placed in series with either the first backup switch 385 or the second backup switch 395. It is activatable to connect the backup battery 390 in series with the first battery array 180 or the second battery array 680 accordingly for re-charging. Upon the completion of the recharging of the backup battery 390, the enable charge switch 370 is deactivated to return to its normal operating position. An illustration of the charge enable switch 398 connected in series with the first backup switch 385 and placed in its normal operating position may be found in FIG. 4d. Said expanded apparatus 350 bypasses the first member battery found faulty in either of the two battery arrays 180 and 680 connected in parallel in an atypical motor vehicle and switches a provided backup battery 390 in series with the faulty battery array to displace the bypassed faulty first member battery thereof, thereby enabling the two battery arrays to continue connection with each other in parallel for a balanced configuration, resulting in no power loss.

FIG. 4a is a schematic block diagrams illustrating one embodiments of an internal structure 400 of the apparatus 300 in connection with a single battery array (180) shown in FIG. 2 in accordance with the present invention. The description of said internal structure 400 refers to FIGS. 1-3, like numbers referring to like elements. Located in the UPA 210, the apparatus 300 illustrated includes a bypass switch 310, referred to here as 310a, and a switch activator module 325a (not shown), a detailed description of which is deferred to the discussion of FIG. 6. The bypass switch 310a includes a selector switch 315a and a pole-connect switch 320.

As depicted, the selector switch 315a is an electrically-operated double-pole multi-position (also known as multi-contact) rotary stepping switch with a step coil 450 having its driver embedded therein. The step coil 450 is used to advance a rotary shaft upon which are mounted two contact arms referred to as first selection contactor 441 and second selection contactor 442 rotatable in the direction of the arrows. This operative connection is indicated by the dash line connecting the step coil 450 with the axis upon which the two selection contactors 441 and 442 are mounted. Without counting the home position referred to below, the switching mechanism of the selector switch 315a consists of two identical single-pole, seven-throw rotary stepping switches that are mechanically ganged together so that they are actuated by the same rotary mechanism to move clockwise at the same time based on the receipt of a single set of step pulses sent to the step coil 450. As such, the whole assembly is termed a double-pole seven-throw two-layer switch.

In each layer, there are eight stationary contacts positioned in an arc and numbered 0, 1, . . . and 7 consecutively, with the selection contactors 441 and 442 normally staying at position 0 410 and 420, respectively, referred to as home position to which a switch reset action causes the selection contactors 441 and 442 to return. There is no output circuit connected to either position 0 contact 410 or 420. In the top layer, the selection contactor 441 is rotatably accessible to contacts numbered 1 through 7 411 through 417, which are independently connected (from their terminals) to positive terminals 131x through 137x of member batteries 1-7 130a-g corresponding in number with conductors 431x through 437x, respectively. Likewise, in the bottom layer, the selection contactor 442 is rotatably accessible to contacts numbered 1 through 7 421 through 427, which are independently connected (from their terminals) to negative terminals 131y through 137y of member batteries 1-7 130a-g corresponding in number with conductors 431y through 437y, respectively. Note that although member batteries 130 are thus connected to the selector switch 315a, this normally open switch does not participate in the operation of the first battery array 180, and is isolated from any battery recharging system used for the first battery array 180. In other words, without the selector switch 315a, operation and recharging of member batteries 130 in the first battery array 180 can proceed as usual. The only time the selector switch 315a is put to use is immediately after a failure occurs in a first member battery 130 that is to be bypassed.

As shown, the step coil 450 has a step pulse signal input terminal labeled S. Upon the receipt of each step pulse in a series, selection contactors 441 and 442 are caused to rotate one position to go into engagement with the next higher numbered contact along the arc beginning from the home position. Each such contact is preferably of the break-before-make or non-shorting type. For example, for selection contactors 441 and 442 to engage contacts 2 412 and 422, respectively, two input step pulses are required. After contacts 1 411 and 421 are engaged by selection contactors 441 and 442 upon the receipt of the first step pulse, respectively, the second step pulse will cause contacts 1 411 and 421 to break before contacts 2 412 and 422 are engaged by the selection contactors 441 and 442, respectively. If member battery 2 130b, for example, happens to be a first member battery that becomes faulty and is to be bypassed in accordance with the present invention, only two step pulses are supposed to be received.

In one embodiment, the electrically-operated pole-connect switch 320 is a normally open single-pole single-throw ("SPST") latching relay switch. It is used to electrically interconnect first pole 418 to second pole 428 upon activation as soon as engagement of the pair of contacts connected to the first member battery 130 found faulty occurs. As illustrated, with conductor 443, the selector switch's 315*a* first pole 418 to which the selection contactor 441 is connected is connected to the pole-connect switch's 320 normally open contact terminal 1*d*. With conductor 444, the selector switch's 315 second pole 428 to which the selection contactor 442 is connected is connected to the pole-connect switch's 320 common terminal 2*d* to which said switch's arm 446 is connected. In general, as soon as engagement of selection contactors 441 and 442 with the selector switch's 315*a* contacts connected to a faulty first member battery 130 occurs, the pole-connect switch 320 will be activated to a closed position. Thus, a closed electrical bypass circuit path across the faulty member battery 130 is formed.

It is noteworthy that in other types of stepping switches or stepping relays, movable contactors similar to above-described selection contactors 441 and 442 may move in a non-rotary manner. For example, if stationary contacts are disposed in a row or a column, each such selection contactor moves horizontally or vertically, respectively. In certain embodiments, the selection contactor of a stepping switching device may not move, such as specified for a stepping relay unit model G9B-06 (six steps) or G9B-12 (12 steps) having a common control terminal for all contacts by the manufacturer Omron Corporation. Furthermore, the definition of actual switch home position may be vendor dependent. In G9B-06 or G9B-12, for example, the home position where a reset signal will return the relay to is its contact 01. Upon the receipt of the first step pulse in a series, contact 02 will be made active.

In an alternative embodiment, solid state relay ("SSR"), which contains no moving parts, may be used for stepping relay functions. SSRs are purely electronic, normally composed of a low current control side (equivalent to the coil in an electromechanical relay) and a high-current load side (equivalent to the contact in a conventional relay). SSRs typically also feature electrical isolation to several thousand volts between the control side and the load side. The so-called home position of the relay may be any position as defined by the manufacturer. The SSR can be integrated into a single package exhibiting low output terminal resistance, and in some instances also provides internal safety features. One such SSR is disclosed in U.S. Pat. No. 7,304,828, entitled INTELLIGENT SOLID STATE RELAY/BREAKER. In such SSR with multiple output MOSFETs, for example, a built-in CPU may determine which current MOSFET to deactivate and the next MOSFET to activate upon the receipt of each step pulse in a pulse train. It can also accommodate various multi-pole, multi-throw switch configurations. In one e-mail message to the inventor of the present invention, the patentee, who owns an SSR manufacturing company, indicates that any number of desired contact positions can be included, and in a certain embodiment, stepping SSRs operable up to 100 kHz are producible. Therefore, in some high-speed (such as featuring sub-second response time) control applications including the one under discussion for the present invention, those SSRs may be preferable to their electromechanical counterparts.

Said internal structure 400 of the apparatus's 300 in connection with the first battery array 180's member batteries 130 gives insight into various aspects of one embodiment of the double-pole multi-position selector switch 315*a* and the SPST pole-connect switch 320 composing the bypass switch 310*a*, which are activatable to bypass a first member battery 130 that becomes faulty. An internal structure of the associated switch activator module 325*a* is shown in FIG. 6. An illustration of formation of a closed electrical bypass circuit path across an exemplary faulty first member battery 130 can be found in FIG. 5.

FIG. 4*b* is a schematic block diagram illustrating one alternative embodiment of the internal structure 500 of the apparatus 300 in connections with a single battery array (180) shown in FIG. 2 in accordance with the present invention. The description of FIG. 4*b* refers to elements of FIGS. 1-3 and 4*a*, like numbers referring to like elements. As illustrated, components of the apparatus 300 include a bypass switch 310*b* and a switch activator module 325*b*, both located in the UPA 210. Said internal structure 500 of the bypass switch 310*b* differs from that of the bypass switch 310*a* shown in FIG. 4*a*, and the switch activator module 325*b* differs from the switch activator module 325*a* shown in FIG. 6, which is used in the apparatus 300 illustrated in FIG. 4*a*.

Components of the bypass switch 310*b* shown in FIG. 4*b* within the H-shaped dotted-line box include a selector switch 315*b* and a pole-connect switch 320, with the latter switch being the same as that depicted in FIG. 4*a*. Although both the selector switch 315*a* shown in FIG. 4*a* and the selector switch 315*b* shown in FIG. 4*b* are of the double-pole multi-contact electrically-operated switch type, unlike the selector switch 315*a* using the form of a sequential-access stepping switch, the selector switch 315*b* uses a direct-access approach, without requiring the generation of step pulses. The selector switch 315*b* in FIG. 4*b* has two sets of multiple normally-open contacts, each of which may be numbered 1-7, connected to the seven member batteries 130, respectively, with each set configured to have multiple internal normally-open electrically-operated SPST switches (may be of the latching relay type). The selector switch 315*b* has first pole 518 and second pole 528, which are selectively connectable to the first set and the second set of contacts, respectively. Although only two SPST switches of each set are shown in the abbreviated illustration of FIG. 4*b*, there are actually seven similar switches in each set including switches 571*x*-577*x* and switches 571*y*-577*y*, using drivers 561*x*-567*x* and 561*y*-567*y*, respectively.

Each such SPST switch has a common terminal 2*d* and a normally open contact terminal 1*d*, and they normally have no continuity between them. While the first set of switches' 571*x*-577*x* common terminals 2*d* are connected together to the first pole 518 at junctions J21-J27, their normally open contact terminals 1*d* are independently individually connected to the positive terminals 131*x*-137*x* of member batteries 1-7 130*a*-*g*, with conductors 431*x*-437*x*, respectively. Likewise, while the second set of switches' 571*y*-577*y* common terminals 2*d* are connected together to the second pole 528 at junctions J31-J37, their normally open contact terminals 1*d* are independently individually connected to the negative terminals 131*y*-137*y* of member batteries 1-7 130*a*-*g*, with conductors 431*y*-437*y*, respectively. The first pole 518 and the second pole 528 are normally unconnected to each other like the first pole 418 and the second pole 428 of the selector switch 315*a* shown in FIG. 4*a*, but they will be connected together if the pole-connect switch 320 is activated.

As mentioned previously, in one embodiment, upon the occurrence of the permanent disablement of the first member battery 130 due to an unrecovered fault condition detected therein, an active 'valid battery fault' control signal transmitted via line 505 for the first battery array 180 along with an identification of the faulty member battery 130, such as provided by the central battery controller, occurs as indicated in FIG. 4b. To indicate the battery number of said faulty first member battery 130 when said active control signal is present, an n-bit digital battery address (a1, a2, . . . , an) signal on the group line 511 is made available for a sufficient duration, where n is typically equal to 8. The switch activator module 325b illustrated in a bracketed section includes a battery address decoder 504, a trigger generator 506, a delay circuit 507, and 14 AND gates including first seven gates 551x-557x and second seven gates 551y-557y (although only 551x-552x and 551y-552y are shown).

The battery address decoder 504 receives a coded battery address signal on line 511 and outputs seven decoded battery-number signals named 'batt 1', 'batt 2', . . . 'batt 6' and 'batt 7' on lines 591-597, representing the presence of member batteries 130a, 130b, . . . 130f, 130g of the first battery array 180, respectively, where one and only one of the seven outputs may be active at a time. For example, if the first member battery 130 found faulty is member battery 2 130b, only the 'batt 2' signal on line 592 is active while all other six outputs are inactive. Based on the occurrence of the 'valid battery fault' control signal on line 505 (rising from a low level to a high level, for example), a trigger pulse is generated by the trigger generator 506, which may be a one-shot multivibrator, for example. To avoid a possible race condition, this trigger pulse passes through the delay circuit 507 to output a delayed trigger pulse signal on line 509. This delayed trigger pulse signal is transmitted to input terminals of all said 14 AND gates 551x-557x and 551y-557y at junctions J3-J9 and junctions J10-J16, respectively (although only two junctions of each group are shown).

However, the delayed trigger pulse on line 509 will pass through only one pair of AND gates wherein the input signal 'batt M' is active, where M may be 1, 2 . . . 6 or 7. For the mentioned exemplary faulty member battery 2 130b, where M=2, only AND gates 552x and 552y allow the delayed trigger pulse on line 509 to pass through because the 'batt 2' signal on line 592 is active. Thereafter, the drivers 562x and 562y will receive said trigger pulse signal and produce output signals to activate switches 572x and 572y, respectively, so that each said switch's terminal 2d and terminal 1d have continuity (shown with a light dotted arrow representing the closure of the switch). Concurrently with the closing of switches 572x and 572y, the pole-connect switch 320 is activated to a closed position (also shown with a light dotted arrow) by applying the delayed trigger pulse on line 509 to its driver 560, thus interconnecting the first pole 518 and the second pole 528 together.

Consequently, a closed electrical bypass circuit path is formed across the exemplary faulty member battery 2 130b, traceable by following connected path segments shown in heavy lines: I. The positive terminal 132x of member battery 2 130b connected to the closed switch 572x with conductor 432x; II. The closed switch 572x connected to the first pole 518 with conductor 582x through junctions J22 and J21; III. The first pole 518 connected to the closed pole-connect switch 320 with conductor 543; IV. The closed pole-connect switch 320 connected to the second pole 528 with conductor 544; V. the second pole 528 connected to the closed switch 572y with conductor 582y through junctions J31 and J32; and VI. The closed switch 572y connected to the negative terminal 132y with conductor 432y.

As an alternative embodiment of the apparatus 300, FIG. 4b illustrates the internal structure 500 of the bypass switch 310b and the switch activator module 325b, and a closed electrical bypass path across the first member battery 130 found faulty is formed by use of different switching arrangement and circuitry than the counterpart shown in FIGS. 4a and 6, without requiring step pulse generation, which requires more electronic circuitry. Beneficially, the speed of forming such bypass is higher because of the direct-access approach used.

FIG. 4c is a schematic block diagram illustrating one embodiment of an internal structure 600 of the expanded apparatus 350 of FIG. 3b in connection with a dual battery array parallel configuration in accordance with the present invention. The description of FIG. 4c refers to elements of FIGS. 1-3, 4a and 4b, like numbers referring to like elements. As depicted, two like battery arrays 180 and 680 are connected in parallel. Without connection details being shown, the left-rotated F-shaped UPA 210 includes a bypass switch 310 connected to the first battery array 180 and a second bypass switch 360 connected to the second battery array 680. If those details were shown, connection of each bypass switch to its associated battery array would look like what is shown in FIG. 4a, for example. The UPA 210 also includes a battery backup module 380, shown disposed at the tail end of both battery arrays although said module may alternatively be disposed at the head of both arrays. The backup battery module 380 includes a backup battery 390, an electrically-operated first backup switch 385 and an electrically-operated second backup switch 395. Both said switches may be of the SPDT latching relay type. The UPA 210 further includes a switch activator module 325 (not shown), a detailed illustration of which may be found in FIG. 6 in conjunction with the use of the type of switches shown in FIG. 4a.

The parallel connection of the first battery array 180 with the second battery array 680 may be traced below. At the array head, the first battery array 180 of seven member batteries 130a-g and the second battery array 680 of seven member batteries 630a-g are connected at junction J1 to the positive terminal 191 of the vehicle operation controller 120 from positive battery terminals 131x and 631x of member battery 1 130a and member battery 1 630a via conductors 181 and 681z, respectively. At the array tail end, the first battery array 180 and the second battery array 680 are connected at junction J2 to the negative terminal 192 of the vehicle operation controller 120 via conductors 182 and 652 through the first backup switch 385 and the second backup switch 395 from negative battery terminals 137y and 637y of member battery 7 137g and member battery 7 630g via conductors 437y and 687y, respectively.

As shown, the first backup switch 385 has its common terminal 1r connected to the negative terminal 137y of member battery 7 130g of the first battery array 180. The first backup switch's 385 common terminal 1r and normally closed contact terminal 2r have continuity through the switch arm 661. Likewise, the second backup switch 395 has its common terminal 1r connected to the negative terminal 687y of member battery 7 630g of the second battery array 680. The second backup switch's 395 common terminal 1r and normally closed contact terminal 2r have continuity through the switch arm 662. Conductor 652 connects the two normally closed contact terminals 2r of said two backup switches. Conductor 653 connects the two normally open contact terminals 3r of said two backup switches.

Conductor 651, emanating from the positive terminal 391x of the backup battery 390, is joined with conductor 653 at junction J3. The negative terminal 391y of the backup battery 390 is connected to the negative terminal 192 of the vehicle operation controller 120 with conductor 182. While the negative terminal 391 of the backup battery 390 is connected to both the first battery array 180 and the second battery array 680 at one end, the positive terminal 391x of the backup battery 390 is not connected to either battery array.

Figure 5:
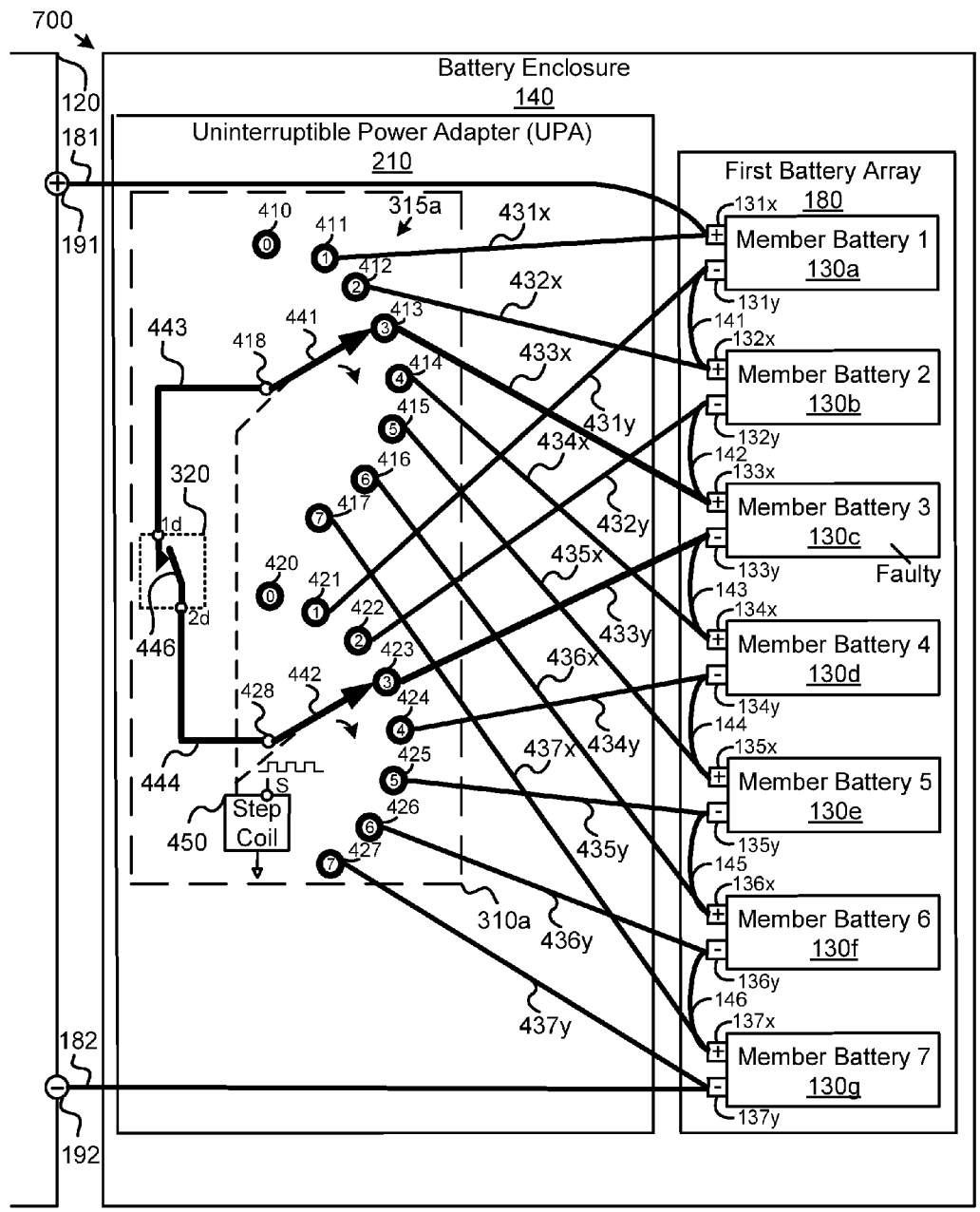
FIG. 5 is a schematic block diagram illustrating one embodiment of formation of a closed electrical bypass circuit path across an exemplary faulty first member battery by the apparatus shown in FIG. 4a in accordance with the present invention.
Figure 6:
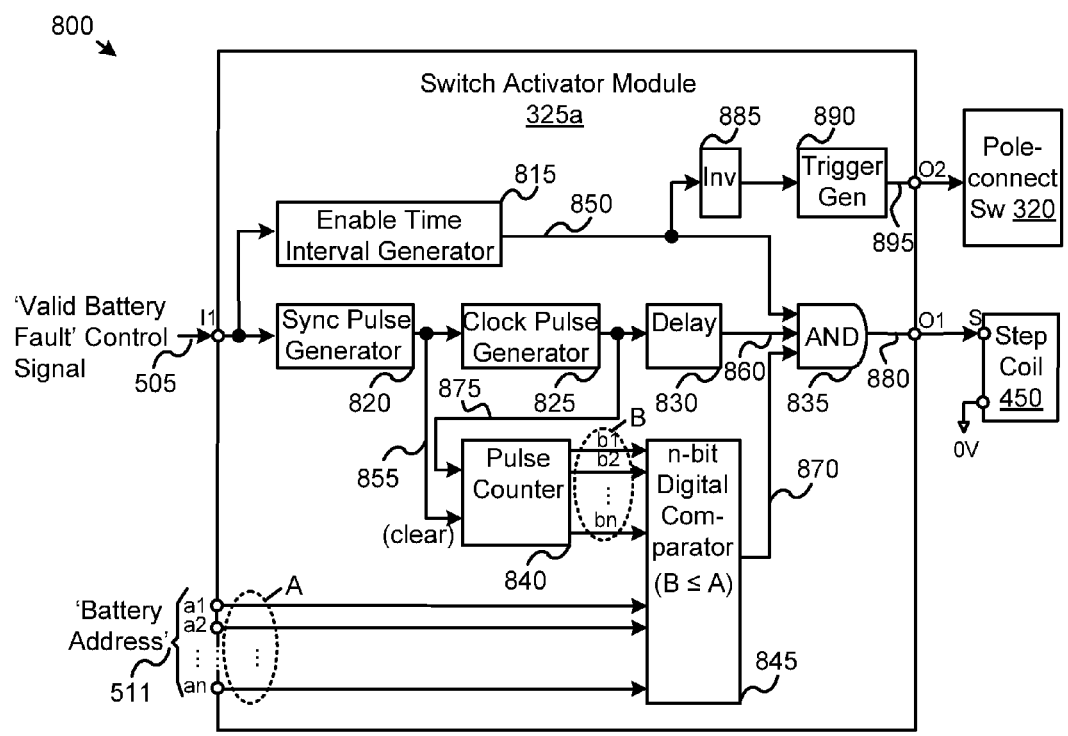
FIG. 6 is a schematic block diagram illustrating one embodiment of electronic circuitry of the switch activator module being part of the apparatus shown in FIG. 4a in accordance with the present invention.

For an illustration of forming a closed electrical bypass circuit path across an exemplary faulty first member battery of the first battery array 180, FIG. 5 may be previewed. Here, if a first member battery found faulty is member battery 2 130*b*, for example, of the first battery array 180, the switch activator module 325 will activate the bypass switch 310 to form a closed electrical bypass circuit path across member battery 2 130*b*, and will further activate the first backup switch 385 to connect the backup battery 390 in series with the first battery array 180. As can be seen, when the first backup switch 385 is activated, its switch arm 661 will be thrown to the normally open contact (terminal 3*r*), whereby member battery 7 130*g* will be connected to the backup battery 390 in series. However, if a first member battery found faulty happens to be member battery 2 630*b*, for example, of the second battery array 680, the switch activator module 325 will activate the second bypass switch 360 to form a closed electrical bypass circuit path across member battery 2 630*b*, and will further activate the second backup switch 395 to connect the backup battery 390 in series with the second battery array 680. When the second backup switch 395 is activated, its switch arm 662 will be thrown to the normally open contact (terminal 3*r*), whereby member battery 7 630*g* will be connected to the backup battery 390 in series. The internal structure 600 of the expanded apparatus 350 of FIG. 3*b* gives insight into working relationship between the dual arrays 180 and 680 and the battery backup module 380 to maintain a continued balanced dual array parallel configuration in the case of a first member battery found faulty in either battery array.

Figure 4D:
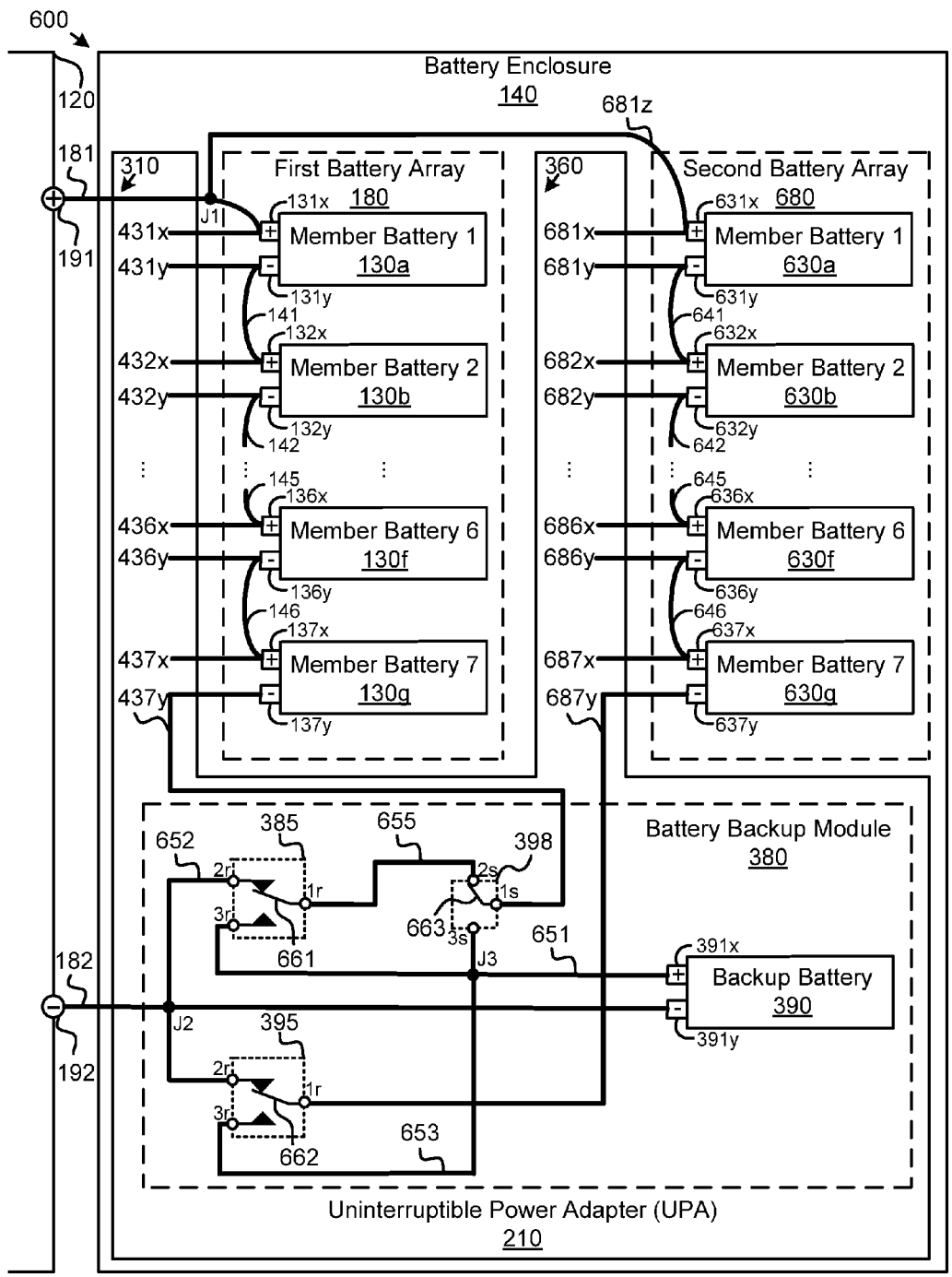
FIG. 4d is a schematic block diagram illustrating one embodiment of an internal structure of the expanded apparatus of FIG. 3b in connection with a dual battery array parallel configuration including battery charging enablement in accordance with the present invention.

FIG. 4*d* is a schematic block diagram illustrating one embodiment of an internal structure 600 of the expanded apparatus 350 of FIG. 3*b* in connection with a dual battery array configuration including battery charging enablement in accordance with the present invention. The description of FIG. 4*d* refers to elements of FIGS. 1-3, 4*a*-4*c*, like numbers referring to like elements. FIG. 4*d* is basically a copy of FIG. 4*c*, except for the inclusion of a charge enable switch 398 placed in series with the first backup switch 385 although it may be placed in series with the second backup switch 395 as well. In the depicted embodiment, the charge enable switch 398 is a manually-operated SPDT switch preferably under a remote control. While normally operating in a non-charging mode, the normally closed contact terminal 2*s* and the common terminal 1*s* of the charge enable switch 398 have continuity through its switch arm 663, which is referred to as first position of said switch. The charge enable switch 398 is shown to be in series with the first backup switch 385, which has its common terminal 1*r* connected to the normally closed contact terminal 2*s* of the charge enable switch 398. Terminal is of the charge enable switch 370 is connected to the negative terminal 137*y* of member battery 7 130*g* with conductor 437*y*.

To enable recharging, the charge enable switch 398 needs to be toggled to its second position where the switch arm 663 is connected to its normally open contact terminal 3*s*, to which the positive terminal 391*x* of the backup battery 390 is connected with conductor 651 at junction J3. The charge enable switch 398 thus allows the backup battery 390 to be connected in series with the first battery array 180 for re-charging. At the completion of the re-charging operation, the charge enable switch 398 needs to be toggled back to its first position, namely, the common terminal is and the normally closed contact terminal 2*s* having continuity. The internal structure 600 of the expanded apparatus 350 of FIG. 3*b* as illustrated in FIG. 4*d* includes a charge enable switch 398 connected in series with the first backup switch 385, with the former enabling recharging of the backup battery 390 when manually activated by connecting the backup battery 390 in series with the first battery array 180.

FIG. 5 is a schematic block diagram illustrating one embodiment of formation 700 of a closed electrical bypass circuit path across an exemplary faulty first member battery 3 130*c* by the apparatus 300 illustrated in FIG. 4*a* in accordance with the present invention. The description of FIG. 5 refers to elements of FIGS. 1-4, like numbers referring to like elements. The formation 700 in the depicted embodiment involves a first member battery 130 found faulty, which is member battery 3 130*c*, for example. It is identified when a 'valid battery fault' control signal on line 505 (as shown in FIG. 6) is raised possibly by the central battery controller to the UPA 210 following the occurrence of a permanent physical disablement on said member battery 130 while the vehicle is in operation.

In response to said control signal and the identification of member battery 3 130*c* as a faulty one, the switch activator module of 325*a* (not shown) in the UPA 210 outputs three step pulses in a series to the step signal input terminal S of the step coil 450 of the selector switch 315*a*, causing the selection contactors 441 and 442 thereof to advance three positions in succession: from the home positions 410 and 420 to engage and disengage contacts 1 411 and 421, engage and disengage contacts 2 412 and 422, and then engage contacts 3 413 and 423 of the selector switch 315*a*, respectively, and to stop there as the shaft is mechanically detented as long as another step pulse does not occur. Note that said switch's top layer contact 3 413 is connected to the positive terminal 133*x* of member battery 3 130*c*, and that said switch's bottom layer contact 3 423 is connected to the negative terminal 133*y* of member battery 3 130*c*. As soon as engagement of the last two contacts 413 and 423 by the selection contactors 441 and 442, respectively, occurs, the pole-connect switch 320 is activated to a closed position, where its terminals 1*d* and 2*d* now have continuity, connecting the first pole 418 to the second pole 428, whereby a closed electrical bypass circuit path is formed across the faulty member battery 3 130*c*, as shown in heavy lines. Thus, the battery power of the first battery array 180 is uninterrupted although there is a fractional loss of power. It is imperative for the vehicle system to provide an indication of the occurrence of member battery 3 130*c* gone faulty and request that the vehicle driver proceed to have it serviced.

As known in the art, a bypass around a potentially failed battery cell is required to prevent loss of the storage capacity of the entire cell array. The bypass must not conduct when the battery cell is functioning properly, but it must activate to provide an electrical conductive bypass when the cell fails in the open-circuited mode. Diodes and relays have been used to provide this bypass function although the bypass diode has a relative high voltage drop that dissipates power when it functions as a bypass. At the battery module level, bypassing a first member battery 130 found faulty may be accomplished in an embodiment other than that of the bypass switch 310*a* (or 310*b*) described thus far, such as one in which an individual normally-open SPST relay is provided and connected across the terminals of each member battery 130. When a first member battery 130 becomes faulty, its connected relay may be activated to a closed position to achieve bypassing.

In general, if the first battery array 130 has M member batteries 130, M such normally-open SPST relays may be connected to those member batteries individually in an alternative embodiment. When a first member battery 130 is found faulty, its connected relay is activated to form a closed electrical bypass circuit path across it. This kind of bypassing scheme is functionally equivalent to that of the bypass switch 310*a*, which uses a single double-pole M-position selector switch 315a plus one SPST pole-connect switch 320 and may bypass any one of M member batteries 130 found faulty in the first battery array 180.

In a practical battery-powered EV application, M may be equal to 16, for example, to provide a 24-kWh battery pack equivalent to what is used in an electric car such as the 2011 Nissan Leaf. Those 16 1.5-kWh battery modules may be obtained from Panasonic Corporation, which makes each battery module from 18650-type (18 mm in diameter×65 mm in length) Li-ion battery cells capable of delivering a total voltage of 25.2 V with a capacity of 58 Ah. For a specialty electric car such as the high-performance 53-kWh Tesla Roaster, however, 36 of said Panasonic battery modules are needed, in which case, instead of using a single double-pole 36-position selector switch 315 and a single pole-connect switch 320, using two double-pole 18-position selector switches 315 and two pole-connect switches 320 may be a practical alternative.

In a further alternative embodiment, an M×M crosspoint switch, also known as matrix switch, may be used to connect the positive terminal of each member battery 130 to a switch input (in a row) and the negative terminal thereof to a switch output (in a column), for example, with each such input-output pair numbered in correspondence to the number of each member battery 130. A normally-open switch at a cross point of the appropriate input-output pair may be activated to a closed position to bypass the corresponding member battery 130 if found faulty. In this alternative embodiment, however, only M crosspoints out of $M^2$ possible crosspoints are usable, with most of the switching fabric of an M×M crosspoint switch being wasted.

Unfortunately, in these alternative embodiments, a certain switch malfunction due to an internal element failure, for example, can cause enormous damage by accidentally shorting a perfectly operable member battery 130. On the other hand, the two-part approach of using the bypass switch 310a (or 310b) in accordance with the present invention, which includes the activation of the double-pole multi-contact selector switch 315a (or 315b) and the activation of the pole switch 320, is safer. The reason for that can be described as follows: even if the selector switch 315a malfunctioned, so that the selection contactors 441 and 442 as shown in FIG. 5 were erroneously engaging certain stationary contacts connected to a pair of terminals of the corresponding member battery 130, the pole-connect switch 320 would unlikely be activated to interconnect the first pole 418 and the second pole 428 together, or vice versa. Furthermore, a safety precaution can be taken in a certain embodiment of the present invention such that said two switches can be caused to be reset as soon as the 'valid faulty battery' control signal on line 505 occurs to assure that they are positioned properly for use. The formation 700 of a closed electrical bypass circuit path across the faulty first member battery 130 by the apparatus 300 shown in FIG. 4a takes place automatically while the vehicle is in operation, thereby enabling the first battery array 180 to continue to operate to keep the using vehicle moving, without a stop.

FIG. 6 is a schematic block diagram illustrating one embodiment of electronic circuitry 800 of the switch activator module 325a being part of the apparatus 300 shown in FIG. 4a in accordance with the present invention. The description of FIG. 6 includes elements of FIGS. 1-5, like numbers referring to like elements. The electronic circuitry 800 includes an enable time interval generator 815, an inverter 885, a trigger generator 890, a sync pulse generator 820, a clock pulse generator 825, a delay circuit 830, a 3-input AND gate 835, a pulse counter 840, and an n-bit digital comparator (B≤A) 845.

In the depicted embodiment, the switch activator module 325a first receives the 'valid battery fault' control signal on line 505, which rises from a normally low level ("low", a logic "0") to a high level ("high", a logic "1"), possibly raised by the central battery controller, at an input terminal labeled I1. Then, the enable time interval generator 815 using a one-shot multivibrator, for example, is triggered to produce an enable time interval signal on line 850, which is used as a gating pulse, on a positive transition (from low to high). This gating pulse width is large enough to enable the passing-through of the maximum number of step pulses required by the selector switch 315a to reach the highest numbered contact in its contact range. For the selector switch 315a illustrated in FIGS. 4a and 5, for example, said maximum number is seven (7). The width of this gating pulse is set by selecting a required RC time constant, where R is the resistance and C is the capacitance built in the multivibrator circuit.

Step pulses are typically of a square wave type (50% duty cycle) whose minimum ON time and OFF time are specifiable for the kind of stepping switch (relay) used for the selector switch 315a. The clock pulse generator 825 is used to generate an output signal on line 875 that includes a series of pulses required to allow the selector switch 315a to advance to the desired position to engage the pair of contacts thereof connected to the first member battery 130 found faulty. In one embodiment, to implement the clock pulse generator 825, an astable multivibrator is used, which functions as an oscillator whose frequency meets the required step pulse rate by selecting appropriate resistance and capacitance in its circuit design. For the purpose of producing a precise number of step pulses required, it is desirable to use an externally synchronized or gated astable multivibrator to selectively produce continuous oscillations (operation) in response to a control signal. A one-shot multivibrator can be used to generate such control signal, typically including a narrow pulse, upon the occurrence of the 'valid battery fault' control signal on line 505 at input terminal I1. The sync pulse generator 820 serves this purpose. The output of the sync pulse generator 820 is referred to as a synch pulse signal on line 855. In a preferred embodiment, the sync pulse signal is used not only to gate the clock pulse generator 825, but also clear the pulse counter 840 as shown. Furthermore, the synch pulse signal on line 855 may also be used to reset the selector switch 315a to its home position and reset the pole-connect switch 320 to its normally open position (both not shown).

A signal consisting of a series of clock pulses on line 875 outputted by the clock pulse generator 825 passing through the delay circuit 830 will be used as a source of step pulses while the enable time interval signal on line 850 generated by the enable time interval generator 815 is active. However, in the embodiment illustrated in FIG. 5, since the required number of step pulses equals the battery number of the faulty member battery 130, a binary counter may be used to count clock pulses in the signal on line 875, which is the output of the clock pulse generator 825. For the n-bit battery address signal on the group line 511 supplied to input terminals labeled a1, a2, . . . an (typically n equals 8) of the switch activator module 325a identifying the faulty member battery 130 while the 'valid battery fault' control signal on line 505 is active, an n-bit pulse counter 840 with an n-bit output (b1, b2, . . . bn) is used to count said clock pulses. For example, if n=3, a 3-bit counter will step through the binary sequences 000, 001, 010, . . . , 110 and 111; in terms of decimal value, it is 0, 1, 2 . . . 6, and 7. Let A represent the n-bit battery address (a1, a2, . . . an) signal on line 511, and let B represent n-bit output signal consisting of bits b1, b2, . . . bn produced by the pulse counter 840.

To obtain a precise number of step pulses to be applied to the step coil 450 input terminal S through an internal driver (not shown) to cause the selector switch 315*a* to rotate the required number of steps, a B≤A (B less than or equal to A) gating signal needs to be logically produced. Therefore, the n-bit digital comparator (B≤A) 845 is used to produce it. For example, if the faulty member battery 130 is member battery 3 130*c*, then the decimal equivalent of A is 3, and the B≤A gating signal should be active as long as the pulse count B (decimal equivalent) is 3 or less. To obtain the B≤A gating signal, a commercially available B>A digital comparator module, for example, may be used, and said module output B>A would need to be inverted. Finally, the required number of delayed clock pulses on line 860 to be used in the series of step pulses included in the step signal on line 880, which is to be outputted to the step coil input terminal S, are passed through the AND gate 835 while both the enable time interval signal on line 850 is active and the B≤A gating signal on line 870 is active.

When the enable time interval signal on line 850 expires (that is, changes from high to low), a trigger signal on line 895 is generated by the trigger generator 890 with the enable time interval signal inverted through the inverter circuit 885 as its input. The trigger signal on line 895 is transmitted out of output terminal O2 of the switch activator module 325*a* to initiate the activation of the pole-connect switch 320 to interconnect the first pole 418 to the second pole 428. Thus, the identified faulty first member battery 130 is bypassed. See FIG. 7 for an illustration of the step-by-step operation of the switch activator module 325*a* described thus far on the exemplary first member battery 3 130*c* found faulty as shown in FIG. 5.

Note that the trigger signal on line 895 may also be used to activate the first backup switch 385 to connect the backup battery 390 in series with the first battery array 180 in a multiple battery array parallel configuration as illustrated in FIG. 4*c*. Also note that the electronic circuitry 800 of the switch activator module 325*a* may operate on the second battery array 680 shown in FIG. 4*c* based on the occurrence of a separate "valid battery fault" control signal (not shown) for the second battery array 680 in the same manner as it does on the first battery array 180 described above. For a typical electric motor vehicle, the electronic circuitry 800 of the switch activator module 325*a* activates the bypass switch 310*a* to form a closed electrical bypass circuit path across the identified faulty first member battery 130 following the receipt of the 'valid battery fault' control signal on line 505 for the first battery array 180 and the 'battery address' signal on line 511.

Figure 7:
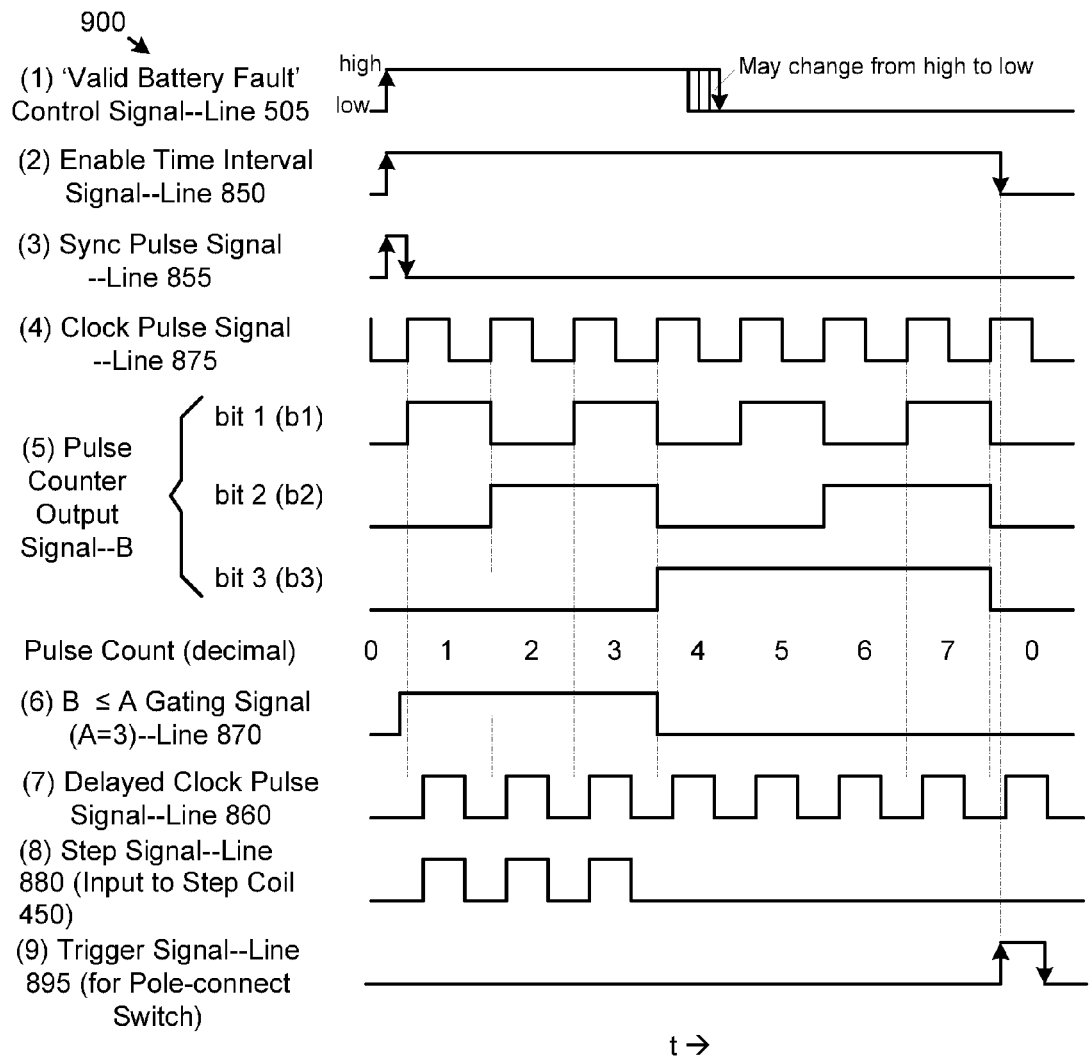
FIG. 7 is a time chart illustrating one embodiment of the operation of the switch activator module of FIG. 6 for forming a closed electrical bypass circuit path across the exemplary faulty first member battery shown in FIG. 5 in accordance with the present invention.

FIG. 7 is a time chart illustrating one embodiment of the operation 900 of the switch activator module 325*a* of FIG. 6 for forming a closed electrical bypass circuit path across an exemplary faulty first member battery 3130*c* shown in FIG. 5 in accordance with the present invention. The description of FIG. 7 refers to elements of FIGS. 1-6, like numbers referring to like elements. The operation 900 is described in terms of nine waveforms labeled (1) through (9), each illustrating a sub-operation of the switch activator module 325*a*. Beginning with the receipt of the 'valid battery fault' control signal on line 505 at input terminal I1, which rises from low to high having a waveform illustrated in FIG. 7 at (1), the enable time interval generator 815 produces an output signal known as enable time interval on line 850 having a waveform illustrated at (2). The sync pulse signal on line 855, the output of the sync pulse generator 820, is used to synchronize the starting of the clock pulse generator 825 and is produced upon the appearance of the 'valid battery fault' control signal on line 505 going from low to high. The sync pulse signal on line 855 has a waveform illustrated at (3). As shown, the width of the enable time interval signal is slightly larger than the total time duration of seven complete clock pulses on line 875 included in the output signal produced by the clock pulse generator 825. The clock pulse signal on line 875 has a waveform illustrated at (4).

For the configuration of the first battery array 180 illustrated in FIG. 5, a simplification of the battery address signal is made herein, so that the battery address A has three bits: a1, a2, and a3, where n=3, used to identify any one of the seven individual member batteries 130 shown. Likewise, a 3-bit pulse counter 840 is assumed to be used to count a maximum of seven clock pulses (1 through 7, excluding 0) that are needed to produce a maximum number of step pulses. The 3-bit output signals of the pulse counter 840 are labeled b1, b2, and b3, with their grouping named B, having waveforms of the three bits illustrated at (5). Note that a1 and b1 are the least significant bits and a3 and b3 are the most significant bits of their respective binary numbers. Table 1 lists the pulse counts in decimal derived from the combination of the three output bits b1, b2, and b3 of the pulse counter 840. Table 2 lists possible battery numbers in decimal derivable from the 3-bit battery address on line 511. Table 3 shows the values of B≤A, where the battery number of the exemplary faulty member battery 3 130*c* is a constant 3 in decimal. While A equals 3, the B≤A gating signal on line 870, which is the output of the 3-bit digital comparator (B≤A) 845, has a waveform illustrated at (6).

TABLE 1

| Pulse Counter Output B | | | Pulse Count |
|---|---|---|---|
| b3 | b2 | b1 | (decimal) |
| 0 | 0 | 0 | 0 |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 |

TABLE 2

| Battery Address A | | | Battery No. |
|---|---|---|---|
| a3 | a2 | a1 | (decimal) |
| 0 | 0 | 0 | 0 |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 |

TABLE 3

| Pulse Counter Output B | | | Battery Address A (Member Battery 3 130c) | | | B ≤ A |
|---|---|---|---|---|---|---|
| b3 | b2 | b1 | a3 | a2 | a1 | Value |
| 0 | 0 | 0 | 0 | 1 | 1 | 1 |
| 0 | 0 | 1 | 0 | 1 | 1 | 1 |
| 0 | 1 | 0 | 0 | 1 | 1 | 1 |

TABLE 3-continued

| Pulse Counter Output B | | | Battery Address A (Member Battery 3 130c) | | | B ≤ A |
|---|---|---|---|---|---|---|
| b3 | b2 | b1 | a3 | a2 | a1 | Value |
| 0 | 1 | 1 | 0 | 1 | 1 | 1 |
| 1 | 0 | 0 | 0 | 1 | 1 | 0 |
| 1 | 0 | 1 | 0 | 1 | 1 | 0 |
| 1 | 1 | 0 | 0 | 1 | 1 | 0 |
| 1 | 1 | 1 | 0 | 1 | 1 | 0 |

The clock pulse signal on line 875 generated by the clock pulse generator 825 passing through the delay circuit 830 results in delayed clock pulses in the signal on line 860 having a waveform illustrated at (7). The step signal on line 880 including delayed clock pulses passing through the AND gate 835 while both the B≤A gating signal on line 870 is active and the enable time interval signal on line 850 is active is a signal including exactly three step pulses in a series having a waveform illustrated at (8). The step signal on line 880 is transmitted out of output terminal O1 of the switch activator module 325*a* to input terminal S of step coil 450 to activate the selector switch 315*a*.

With the incoming step signal from line 880, the pair of selection contactors 441 and 442 of the selector switch 315*a* are caused to advance three steps from the home positions 410 and 420, respectively, to engage the pair of contacts 413 and 423 connected to terminals 133*x* and 133*y* of member battery 3 130*c*, respectively, as depicted in FIG. 5. When the enable time interval signal on line 850 expires (changes from high to low), a trigger signal on line 895 having a waveform illustrated at (9) is produced by the trigger generator 890 with its input signal transitioning from low to high by inverting the enable time interval signal on line 850, using a one-shot multivibrator, for example. The trigger signal on line 895 is transmitted out of output terminal O2 of the switch activator module 325*a* to initiate the activation of the pole-connect switch 320 as shown in FIG. 6. Thus, a closed electrical bypass circuit path is formed across member battery 3 130*c*, as illustrated in FIG. 5. The operation 900 of electronic circuitry of the switch activator module 325*a* depicted in FIG. 6 accomplishes the task of forming a closed electrical bypass circuit path across the exemplary faulty member battery 3 130*c*.

Figure 8:
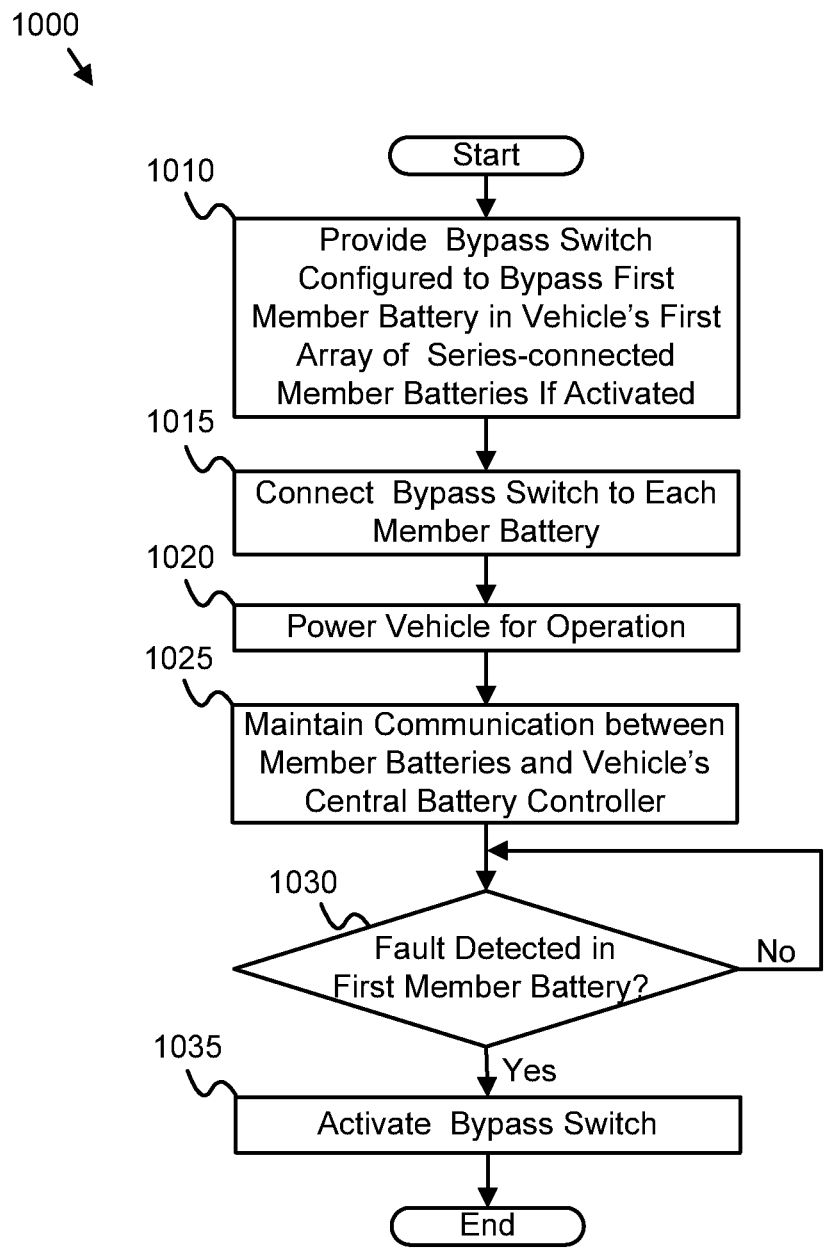
FIG. 8 is a schematic flow chart diagram illustrating one embodiment of a method for assuring uninterruptible battery power in an electric motor vehicle in accordance with the present invention.

FIG. 8 is a schematic flow chart diagram illustrating one embodiment of a method 1000 for assuring uninterruptible battery power in an electric motor vehicle in accordance with the present invention. The description of FIG. 8 refers to elements of FIGS. 1-7, like numbers referring to like elements. The method 1000 begins by providing 1010 a bypass switch 310 (310*a* or 310*b* unless otherwise specified) configured to form a closed electrical bypass circuit path across a first member battery 130 found faulty in the first battery array 180 supplying power to the electric motor vehicle if activated. In the depicted embodiment here, the bypass switch 310*a* is chosen as an example, and it includes a double-pole multi-position selector switch 315*a* and a pole-connect switch 320 as shown in FIGS. 4*a* and 5.

The method 1000 proceeds to connect 1015 the bypass switch 310*a* to each member battery 130. With the selector switch 315*a* of the normally open electrically-operated type used as illustrated in FIG. 4*a*, the first set of electrical contacts 411 through 417 connectable to the first pole 418 are independently individually connected to positive terminals 131*x* through 137*x* of member batteries 130*a* through 130*g* of the first battery array 180, respectively. In addition, the second set of electrical contacts 421 through 427 connectable to the second pole 428 are independently individually connected to negative terminals 131*y* through 137*y* of member batteries 130*a* through 130*g* of the first battery array 180, respectively. If activated, the selector switch 315*a* connects the first pole 418 to the positive terminal of the first member battery 130 found faulty and connects the second pole 428 to the negative terminal of said member battery 130. Along with said connections made, the pole-connect switch 320 of the normally open electrically-operated type is connected across the first pole 418 and the second pole 428, and it is closable to connect the first pole 418 to the second pole 428 if activated.

The method 1000 powers 1020 for operation the electric motor vehicle, wherein the first battery array 180, the bypass switch 310*a*, and the switch activator module 325*a* have been installed. The method 1000 maintains 1025 communication between member batteries 130 and the central battery controller included in the battery enclosure 140. While the electric motor vehicle is running, the switch activator module 325*a* determines 1030 if a fault is detected in a first member battery 130. If a fault is detected in the first member battery 130, the switch activator module 325*a* activates 1035 the bypass switch 310*a*. FIG. 5 illustrates formation of a closed electrical bypass circuit path across the exemplary first member battery 3 130*c*, which is found faulty, after the bypass switch 310*a* is activated. An embodiment of the switch activator module's 325*a* electronic circuitry is illustrated in FIG. 6, with switch activation operation detailed on a timing chart presented in FIG. 7, based on the exemplary member battery 3 130*c* being the faulty first member battery 130 as shown in FIG. 5.

In a certain embodiment, if the first battery array 130 is connected with one or more like battery array in parallel, such as shown in FIG. 4*c*, the method 1000 further provides a bypass switch-310 like bypass switch 340 associated with the second battery array 680 and a battery backup module 380, such as depicted in FIGS. 3*b* and 4*c*. When the first member battery in either battery array is found faulty, in addition to activating the corresponding bypass switch to bypass the faulty first member battery, the method further activates the corresponding backup switch in the battery backup module 380 to connect the backup battery 390 in series with the faulty battery array, so that the two battery arrays may remain connected in parallel. The method 1000 accomplishes the electrical bypassing of a first member battery found faulty, thereby assuring uninterruptible battery power in the using vehicle, and for a multiple battery array parallel configuration, also switches the backup battery 390 into the faulty battery array in series to displace the bypassed member battery, thus maintaining the continuity of the multiple battery array parallel configuration.

Employing an electrically-operated bypass switch, which may include a double-pole multi-contact selector switch and a pole-connect switch in certain embodiments, the present invention has particular suitability to formation of a conductive electrical bypass across a faulty in-use and permanently disabled battery in a substantially large array of series-connected batteries supplying power to an electric motor vehicle. With the use of available high-speed solid-state relay technology instead of the illustrated electromechanical counterparts, the bypass switch may achieve a near instant response time highly desirable to assure uninterruptible battery power in an EV, for example. In a certain embodiment, such as with a multiple battery array parallel configuration, a backup battery may be provided and switched into the faulty battery array in series to displace the bypassed battery. The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
an electrically operated bypass switch configured to form a closed electrical bypass circuit path across a first member battery of a battery array of N series-connected member batteries responsive to activation, wherein N is a positive integer greater than one, said bypass switch comprising:
   a double-pole N-contact selector switch, said selector switch configured to have no electrical connection between the two poles and, while normally deactivated, have neither pole electrically connected to any of the associated N contacts, the first set of N contacts configured to be individually electrically connected to positive terminals of said member batteries, and, likewise, the second set of N contacts configured to be individually electrically connected to negative terminals of said member batteries, and responsive to activation, the activated selector switch configured to make the first pole selectively electrically connectable to any of said first set of N contacts thereof and the second pole selectively electrically connectable to any of said second set of N contacts thereof;
   a normally-open single-pole single-throw pole-connect switch, said pole-connect switch configured to be electrically connected across said two poles of said selector switch and, responsive to activation, the activated pole-connect switch configured to electrically connect said two poles together; and
   wherein said activated bypass switch is configured to have said two poles of said selector switch electrically connected to the contacts thereof that are electrically connected to the positive terminal and negative terminal, respectively, of said first member battery and have said pole-connect switch electrically connect said two poles of said selector switch together; and
a switch activator module configured to activate said bypass switch in response to detection of a failure in said first member battery.

2. The apparatus of claim 1, wherein said bypass switch is replaceable by N electrically-operated normally-open single-pole single-throw switches, each said switch configured to be independently electrically connected across the positive terminal and the negative terminal of one and only one said member battery, and responsive to activation, configured to form a closed electrical bypass circuit path across said member battery.

3. The apparatus of claim 1, wherein if said battery array is connected with one or more like battery arrays in parallel, the apparatus further comprises a) a like bypass switch associated with each said additional battery array, said bypass switch configured to form a closed electrical bypass circuit path across a first member battery thereof responsive to activation, b) a backup battery, and c) an electrically-operated backup switch associated with each battery array participating in the parallel connection, the backup battery configured with electric and electronic characteristics of member batteries, and each said backup switch, while normally deactivated, configured to have said backup battery electrically bypassed by said associated battery array, and responsive to activation, the activated backup switch configured to electrically connect said backup battery in series with said associated battery array.

4. The apparatus of claim 3, wherein the switch activator module is configured to activate both said bypass switch and said backup switch associated with any said battery array in response to detection of a failure in the first member battery thereof, whereby an equal voltage output from each said battery array required for a parallel connection is attained.

5. The apparatus of claim 1, wherein each said member battery is selected from the group consisting of member battery, member fuel cell, and member ultracapacitor, and said battery array is accordingly selected from the group consisting of battery array, fuel cell array, and ultracapacitor array.

6. The apparatus of claim 3, wherein said backup battery is selected from the group consisting of backup battery, backup fuel cell, and backup ultracapacitor.

7. The apparatus of claim 1, wherein the process for accessing the terminals of said first member battery through said activated selector switch is selected from the group consisting of sequential and direct.

8. A system comprising:
an electric motor vehicle operating unit;
an electric motor vehicle operation controller, coupled to the electric motor vehicle operating unit; and
a battery enclosure with battery cooling means, coupled to the electric motor vehicle operation controller, the battery enclosure comprising:
   at least one battery array of N series-connected member batteries supplying power to the electric motor vehicle, wherein N is a positive integer greater than one;
   an uninterruptible power adapter ("UPA"), coupled to said at least one battery array, the UPA comprising:
      at least one electrically-operated bypass switch each configured to form a closed electrical bypass circuit path across a first member battery of an associated battery array responsive to activation, each of said at least one bypass switch comprising:
         a double-pole N-contact selector switch, said selector switch configured to have no electrical connection between the two poles and, while normally deactivated, have neither pole electrically connected to any of the associated N contacts, the first set of N contacts configured to be individually electrically connected to positive terminals of said member batteries, and, likewise, the second set of N contacts configured to be individually electrically connected to negative terminals of said member batteries, and responsive to activation, the activated selector switch configured to make the first pole selectively electrically connectable to any of said first set of N contacts thereof and the second pole selectively electrically connectable to any of said second set of N contacts thereof;
         a normally-open single-pole single-throw pole-connect switch, said pole-connect switch configured to be electrically connected across said two poles of said selector switch and, responsive to activation, the activated pole-connect switch configured to electrically connect said two poles together; and
      wherein said activated bypass switch is configured to have said two poles of said selector switch electrically connected to the contacts thereof that are electrically connected to the positive terminal and negative terminal, respectively, of said first member battery and have said pole-connect switch electrically connect said two poles of said selector switch together;

a switch activator module configured to activate any of said at least one bypass switch in response to detection of a failure in said first member battery of the associated battery array; and a plurality of electric conductors with connection means configured to electrically interconnect said components; and a central battery controller, interfacing with said member batteries of each said at least one battery array and the UPA, configured to provide battery operation and charge control and communication.

9. The system of claim 8, wherein each of said at least one bypass switch is replaceable by N electrically-operated normally-open single-pole single-throw switches, each said switch configured to be independently electrically connected across the positive terminal and the negative terminal of one and only one member battery of the associated battery array, and responsive to activation, configured to form a closed electrical bypass circuit path across said member battery.

10. The system of claim 8, wherein if said at least one battery array is connected with one or more like battery arrays in parallel, the UPA further comprises a) a like bypass switch associated with each said additional battery array, said bypass switch configured to form a closed electrical bypass circuit path across a first member battery thereof responsive to activation, b) a backup battery, and c) an electrically-operated backup switch associated with each battery array participating in the parallel connection, the backup battery configured with electric and electronic characteristics of member batteries, and each said backup switch, while normally deactivated, configured to have said backup battery electrically bypassed by said associated battery array, and responsive to activation, the activated backup switch configured to electrically connect said backup battery in series with said associated battery array.

11. The system of claim 10, wherein the switch activator module is configured to activate both said bypass switch and said backup switch associated with any said battery array in response to detection of a failure in the first member battery thereof, whereby an equal voltage output from each said battery array required for a parallel connection is attained.

12. The system of claim 8, wherein the process for accessing the terminals of said first member battery through said activated selector switch is selected from the group consisting of sequential and direct.

13. A method for assuring uninterruptible battery power for an electric motor vehicle powered by a battery array of N series-connected member batteries, wherein N is a positive integer greater than one, comprising:

providing an electrically-operated bypass switch configured to form a closed electrical bypass circuit path across a first member battery of said battery array responsive to activation, said bypass switch comprising:

a double-pole N-contact selector switch, said selector switch configured to have no electrical connection between the two poles and, while normally deactivated, have neither pole electrically connected to any of the associated N contacts, the first set of N contacts configured to be individually electrically connected to positive terminals of said member batteries, and, likewise, the second set of N contacts configured to be individually electrically connected to negative terminals of said member batteries, and responsive to activation, the activated selector switch configured to make the first pole selectively electrically connectable to any of said first set of N contacts thereof and the second pole selectively electrically connectable to any of said second set of N contacts thereof;

a normally-open single-pole single-throw pole-connect switch, said pole-connect switch configured to be electrically connected across said two poles of said selector switch and, responsive to activation, the activated pole-connect switch configured to electrically connect said two poles together; and wherein said activated bypass switch is configured to have said two poles of said selector switch electrically connected to the contacts thereof that are electrically connected to the positive terminal and negative terminal, respectively, of said first member battery and have said pole-connect switch electrically connect said two poles of said selector switch together;

connecting said bypass switch to each said member battery electrically;

powering the electric motor vehicle for operation;

maintaining communication between said member batteries and a central battery controller of the electric motor vehicle; and activating said bypass switch in response to detection of a failure in said first member battery, whereby a closed electrical bypass circuit path is formed across said first member battery.

14. The method of claim 13, wherein said bypass switch is replaceable by N electrically-operated normally-open single-pole single-throw switches, each said switch configured to be independently electrically connected across the positive terminal and the negative terminal of one and only one said member battery, and responsive to activation, configured to form a closed electrical bypass circuit path across said member battery.

15. The method of claim 13, wherein if said battery array is connected with one or more like battery arrays in parallel, the method further comprises providing a) a like bypass switch associated with each said additional battery array, said bypass switch configured to form a closed electrical bypass circuit path across a first member battery thereof responsive to activation, b) a backup battery, and c) an electrically-operated backup switch associated with each battery array participating in the parallel connection, the backup battery configured with electric and electronic characteristics of member batteries, and each said backup switch, while normally deactivated, configured to have said backup battery electrically bypassed by said associated battery array, and responsive to activation, the activated backup switch configured to electrically connect the backup battery in series with said associated battery array.

16. The method of claim 15, further comprising connecting each said additional bypass switch to said associated battery array electrically, connecting each said backup switch to said associated battery array electrically, and activating said backup switch associated with any said battery array in response to detection of a failure in the first member battery thereof, whereby an equal voltage output from each said battery array required for a parallel connection is attained.

17. The method of claim 13, wherein said member battery is selected from the group consisting of member battery, member fuel cell, and member ultracapacitor, and said battery array is accordingly selected from the group consisting of battery array, fuel cell array, and ultracapacitor array.

18. The method of claim 15, wherein said backup battery is selected from the group consisting of backup battery, backup fuel cell, and backup ultracapacitor.

19. The method of claim 13, wherein the process for accessing the terminals of said first member battery through said activated selector switch is selected from the group consisting of sequential and direct.

* * * * *